United States Patent
Migdal et al.

(10) Patent No.: US 8,538,820 B1
(45) Date of Patent: Sep. 17, 2013

(54) METHOD AND APPARATUS FOR WEB-ENABLED RANDOM-ACCESS REVIEW OF POINT OF SALE TRANSACTIONAL VIDEO

(75) Inventors: Joshua Migdal, Wayland, MA (US); Matthew Farrow, Canton, MA (US); Vikram Srinivasan, Billerica, MA (US); Malay Kundu, Lexington, MA (US)

(73) Assignee: Stoplift, Inc., Cambridge, MA (US)

( * ) Notice: Subject to any disclaimer, the term of this patent is extended or adjusted under 35 U.S.C. 154(b) by 261 days.

(21) Appl. No.: 12/912,473

(22) Filed: Oct. 26, 2010

Related U.S. Application Data

(60) Provisional application No. 61/254,916, filed on Oct. 26, 2009.

(51) Int. Cl.
*G06Q 20/00* (2012.01)
*H04N 7/18* (2006.01)

(52) U.S. Cl.
USPC .......................................... 705/16; 348/153

(58) Field of Classification Search
USPC ....................................................... 705/16
See application file for complete search history.

(56) References Cited

U.S. PATENT DOCUMENTS

| | | | | |
|---|---|---|---|---|
| 5,491,511 A | * | 2/1996 | Odle | 348/153 |
| 5,497,314 A | * | 3/1996 | Novak | 705/17 |
| 7,631,808 B2 | * | 12/2009 | Kundu et al. | 235/383 |
| 7,925,536 B2 | * | 4/2011 | Lipton et al. | 705/16 |
| 8,146,811 B2 | * | 4/2012 | Kundu et al. | 235/383 |

* cited by examiner

*Primary Examiner* — Garcia Ade
(74) *Attorney, Agent, or Firm* — Chapin IP Law, LLC

(57) ABSTRACT

Techniques disclosed herein include a reviewer interface for providing random-access review of point-of-sale (POS) video, visual indicators to point to point to objects within the point-of-sale video, and/or display of interactive statistical features. The system obtains video data of point-of-sale transactions, and corresponding transaction data correlated with the video data. The system identifies and displays transaction events of interest. In one embodiment, such a display includes displaying a visual indicator positioned at a spatial location within displayed video to identify a location of an object in the displayed video that corresponds to the transaction event identified as a transaction event of interest. The system also includes functionality to display visual indicators associated with transaction data to convey magnitude or quantity of transaction events of interest. The system also includes interactive graphs and filtering criteria for displaying transaction statistics and to browse details of transaction events.

60 Claims, 14 Drawing Sheets

STOPLIFT
CHECKOUT VISION SYSTEMS

Store List

| Company | Store Number | Added Today | Not Viewed | Active | Total | View |
|---|---|---|---|---|---|---|
| 5 | 1 | 2 | 1 | 58 | 588 | All Incidents |
| 5 | 3 | 0 | 0 | 53 | 868 | All Incidents |
| 5 | 7 | 2 | 0 | 46 | 566 | All Incidents |
| 5 | 8 | 0 | 0 | 70 | 1283 | All Incidents |
| 5 | 10 | 2 | 0 | 41 | 418 | All Incidents |
| 5 | 11 | 3 | 1 | 77 | 1300 | All Incidents |
| 5 | 14 | 3 | 1 | 63 | 782 | All Incidents |
| 5 | 16 | 1 | 0 | 23 | 207 | All Incidents |
| 5 | 19 | 2 | 0 | 53 | 652 | All Incidents |
| 5 | 20 | 2 | 0 | 39 | 624 | All Incidents |
| 5 | 22 | 0 | 0 | 51 | 794 | All Incidents |

*FIG. 3*

| Cashier | Cashier Incidents | # of Incidents | Loss Type | Day | Transaction ID |
|---|---|---|---|---|---|
| 6001 | 4 | 1 | MCB | 2009-10-20 | 3758 |
| 4791 | 1 | 1 | MCB | 2009-10-20 | 531 |
| 4552 | 1 | 1 | Avoided | 2009-10-21 | 106 |
| 4601 | 5 | 3 | Avoided | 2009-10-20 | 1360 |
| 4441 | 4 | 1 | Reattempted/Abandone | 2009-10-20 | 43 |
| 4391 | 4 | 1 | MCB | 2009-10-19 | 1150 |
| 4391 | 4 | 1 | MCB | 2009-10-19 | 1148 |
| 4641 | 3 | 1 | MCB | 2009-10-19 | 997 |
| 4721 | 6 | 1 | BOB | 2009-10-19 | 1295 |
| 4351 | 8 | 1 | MissedNotReattempted | 2009-10-18 | 1426 |
| 4711 | 3 | 1 | Avoided | 2009-10-18 | 133 |
| 4711 | 3 | 1 | MCB | 2009-10-18 | 130 |
| 4591 | 6 | 1 | BOB | 2009-10-17 | 71 |
| 4591 | 6 | 2 | MCB | 2009-10-17 | 19 |
| 4591 | 6 | 3 | MCB | 2009-10-17 | 9973 |
| 4311 | 1 | 1 | MCB | 2009-10-17 | 466 |
| 4381 | 1 | 1 | MCB | 2009-10-17 | 876 |
| 4351 | 8 | 1 | MissedNotReattempted | 2009-10-16 | 533 |
| 4201 | 3 | 1 | MCB | 2009-10-16 | 689 |
| 4201 | 3 | 1 | MCB | 2009-10-16 | 677 |
| 4192 | 5 | 1 | MCB | 2009-10-16 | 9506 |
| 4192 | 5 | 2 | MCB | 2009-10-16 | 9406 |
| 4601 | 5 | 1 | MissedNotReattempted | 2009-10-15 | 3410 |
| 4501 | 9 | 1 | MissedNotReattempted | 2009-10-14 | 3327 |
| 4201 | 3 | 1 | MissedNotReattempted | 2009-10-14 | 9169 |
| 6002 | 2 | 2 | BOB | 2009-10-13 | 48 |
| 4721 | 6 | 1 | MCB | 2009-10-13 | 9313 |
| 4291 | 18 | 2 | MCB | 2009-10-13 | 6176 |

Transaction List

| Cashier | Cashier Incide... | # of Incidents | Loss Type | Day | Transaction ID | Re... |
|---|---|---|---|---|---|---|
| ⊟ Register: 3 (2 Incidents) | | | | | | |
| 1144 | | 1 | MOB | 2009-07-02 | 11440723 | 3 |
| 1197 | | 1 | ReattemptedAband... | 2009-07-02 | 11970608 | 3 |
| ⊟ Register: 4 (1 Incident) | | | | | | |
| 1444 | | 1 | Avoided | 2009-05-12 | 14446302 | 4 |
| ⊟ Register: 5 (2 Incidents) | | | | | | |
| 5311 | | 1 | MOB | 2009-05-12 | 3093 | 5 |
| 1291 | | 1 | Avoided | 2009-07-02 | 12913838 | 5 |
| ⊟ Register: 6 (11 Incidents) | | | | | | |
| 4961 | | 6 | Avoided | 2009-05-12 | 3012 | 6 |
| 4561 | | 2 | Avoided | 2009-06-02 | 7891 | 6 |
| 1615 | | 1 | MissedNotReattemp... | 2009-07-02 | 16296669 | 6 |
| 1629 | | 1 | MissedNotReattemp... | 2009-07-02 | 16296669 | 6 |
| 1213 | | 1 | MissedNotReattemp... | 2009-07-02 | 12136732 | 6 |
| ⊞ Register: 7 (1 Incident) | | | | | | |
| ⊞ Register: 8 (8 Incidents) | | | | | | |
| ⊞ Register: 9 (5 Incidents) | | | | | | |
| ⊞ Register: 10 (2 Incidents) | | | | | | |

METHOD AND APPARATUS FOR WEB-ENABLED RANDOM-ACCESS REVIEW OF POINT OF SALE TRANSACTIONAL VIDEO

CROSS REFERENCE TO RELATED APPLICATIONS

The present application claims the benefit of U.S. Provisional Patent Application No. 61/254,916 filed on Oct. 26, 2009, entitled "Method And Apparatus For Web-Enabled Random-Access Review Of Point Of Sale Transactional Video," which is incorporated herein by reference in its entirety.

BACKGROUND

Retail establishments commonly use point of sale terminals or other transaction terminals, such as cash registers, to allow customers of those establishments to purchase items. As an example, in a conventional department store, supermarket or other retail establishment, a customer collects items for purchase throughout the store and places them in a shopping cart or basket (item carrier), or simply carries the items to a point of sale terminal to purchase those items in a transaction.

The point of sale terminal may be staffed with an operator such as a cashier who is a person employed by the store to assist the customer in completing the transaction. In some cases, retail establishments have implemented self-checkout point of sale terminals in which the customer is the operator. In either case, the operator typically places items for purchase on a counter, conveyor belt or other item input area. The point of sale terminals can include a scanning device such as a laser or optical scanner device that operates to identify a Uniform Product Code (UPC) label or bar code affixed to each item that the customer desires to purchase. The laser scanner is usually a peripheral device coupled to a computer that is part of the point-of-sale (POS) terminal. The point-of-sale terminal typically also includes an interface for manual item entry.

To scan an item, the operator picks up each item, one by one, from the item input area and passes each item over a scanning area such as a glass window built into the counter or checkout area to allow the laser scanner to detect the UPC code. Once the point-of-sale computer identifies the UPC code on an item, the computer can perform a lookup in a database to determine the price and identity of the scanned item. Alternatively, in every case where the operator can scan the item, the operator may likewise enter the UPC or product identification code into the terminal manually or through an automatic product identification device such as an RFID reader. The term "scan" is defined generally to include all means of entering transaction items into a transaction terminal. Likewise, the term "scanner" is defined generally as any transaction terminal, automated and/or manual, for recording transaction information.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point-of-sale terminal and in response, the operator places the item into an item output area such as a downstream conveyor belt or other area for retrieval of the items by the customer or for bagging of the items into a shopping bag. Once all items in the transaction are scanned in this manner, the operator indicates to the point-of-sale terminal that the scanning process is complete and the point-of-sale terminal displays a total purchase price to the customer who then pays the store for the items purchased in that transaction.

In addition to recording transactions through point-of-sale terminals, retailer establishments also commonly use video surveillance to record point-of-sale activity. Overhead video security cameras record operator behavior near the point-of-sale terminal. Such video security cameras generally operate on a closed circuit network that is separate from the point-of-sale terminal network.

Video surveillance of point-of-sale transaction activity is useful for quality control such as with unintentional failed scans, and to prevent and identify fraud in point-of-sale transactions, such as intentionally failed scans. Some conventional systems include human monitoring systems and video monitoring systems that involve the use of loss prevention personnel overseeing a real-time video feed (or pre-recorded) to identify fraudulent transactions. There also exist automated systems that attempt to identify questionable (suspicious) transactions based on a graphical analysis of video surveillance data.

SUMMARY

Video surveillance of point-of-sale transactions suffers from a variety of deficiencies. By recording an operator's behavior, security personnel can review video to determine whether or not the operator is failing to scan items brought to a point-of-sale terminal, or properly scanning items. Such an approach, however, is burdensome because security personnel are forced to search through every frame of video in order to find instances when the operator, for example, failed to scan items left in shopping carts. This approach is time intensive and requires that security personnel be highly alert when reviewing a multitude of somewhat repetitive and similar video images.

Techniques discussed herein significantly overcome the deficiencies of conventional video surveillance review systems. For example, as will be discussed further, certain specific embodiments herein are directed to a computer and/or network environment in which a video displayer, having access to video surveillance data and point-of-sale transaction data, provides random-access review of point-of-sale transactional video. Embodiments herein provide a new method of reviewing security video of a transaction taking place at a retail establishment's point-of-sale transaction area, or register. Embodiments herein enable random and instantaneous access to any number of transaction events that may be of interest to a loss prevention investigator. Embodiments can include a web-based reviewer for viewing transaction video having added visual indicators, and for viewing interactive displays of transaction statistics and incidents.

More specifically, according to one embodiment, a data manager obtains video data. The video data includes video frames of point-of-sale transactions occurring at a point-of-sale transaction area. The content of the video data includes transaction events. The video data can be obtained, for example, from overhead video surveillance cameras located in a retail area where items are purchased. Such transaction events include, but are not limited to, item scans, weighed items, cash door openings, cashier login, transfer of items to and from a shopping cart, and so forth.

The data manager also obtains transaction data. The transaction data includes transaction data captured from the point-of-sale transactions occurring at the point-of-sale transaction area. The transaction data includes transaction events recorded via at least one point-of-sale transaction device. The point-of-sale transaction device can be any device or system (such as a cash register, bar code scanner, RFID reader, etc.) used to complete a point-of-sale transaction. The transaction data recorded through the point-of-sale transaction terminal includes any data recordable through the point-of-sale transaction terminal. For instance, such data can include item scans, weighed items, item returns, cash register openings, cashier login, start of transaction, and end of transaction. The transaction data is correlated with the video data. Depending on the embodiment, the data manager itself can correlate data, or receive pre-correlated data from a given point-of-sale system. It is common for retailers to operate point-of-sale transaction terminals on one networked system, while operating video surveillance cameras on a second networked system that is at least partially separated from the point-of-sale transaction terminals. It is also common for retailers use an integrated system that delivers correlated data for subsequent processing.

The data manager then identifies transaction events of interest, which can be any event type, or event having a certain predetermined characteristic. For example, some transaction events of interest can include potential fraudulent events, missed item scans, items left in a basket, item voids, etc. The data manager displays video, from the video data, that includes at least one transaction event identified as a transaction event of interest. The data manager also displays a visual indicator positioned at a spatial location within at least one video frame of the displayed video. The position of the visual indicator identifies a location of at least one object within the at least one video frame. This one object corresponds to the at least one transaction event identified as a transaction event of interest. For example, by way of a non-limiting embodiment, the data manager displays a crosshair or target over a specific item, an arrow pointing to the specific item, etc. The indicator can also be customized for each event using analysis of the video. For example, the indicator can be a silhouette or outline of an object involved in the event of interest, producing a highlighting effect.

In another embodiment, the data manager provides a graphical user interface for selection and viewing of transaction events. The data manager also, in response to receiving a selection via the graphical user interface of at least one transaction event of interest, displays video data of a point-of-sale transaction corresponding to the selected transaction event of interest by initiating playback of the corresponding video data beginning at about a point of occurrence of the transaction event of interest within the corresponding point-of-sale transaction. For example if a reviewer selects a given transaction having an incident (transaction event of interest), the data manager can begin playing video for that transaction by starting video playback at about a point when the incident happens within the video data. Such a technique provides significant time savings for a user looking into a transaction event, which typically includes a small portion of a much longer transaction. Rather than requiring the user to wade through the entire transaction to find the portion of interest, the transaction event of interest is played starting at the most interesting or relevant part.

In another embodiment, the data manager provides a graphical user interface that displays transaction statistics, including selectable and interactive statistical information. In response to receiving a selection of filter criteria for transaction statistics of interest, the data manager groups transaction data according to the selected filter criteria and displays summary information associated with the group of transaction data.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: obtaining video data, the video data including video frames of point-of-sale transactions occurring at a point-of-sale transaction area, the video data including transaction events; obtaining transaction data, the transaction data including transaction data captured from the point-of-sale transactions occurring at the point-of-sale transaction area, the transaction data including transaction events recorded via at least one point-of-sale transaction device, the transaction data being correlated with the video data; identifying transaction events of interest; displaying video, from the video data, that includes at least one transaction event identified as a transaction event of interest; and displaying a visual indicator positioned at a spatial location within at least one video frame of the displayed video, the position of the visual indicator identifying a location of at least one object within the at least one video frame, the at least one object corresponding to the at least one transaction event identified as a transaction event of interest. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by StopLift, Inc. of Cambridge, Mass. 02138.

As discussed above, techniques herein are well suited for use in software applications supporting retail loss protection. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 3 is an example display of point-of-sale transaction data according to embodiments herein.

FIG. 4 is an example display of point-of-sale transaction data and accompanying video reviewer according to embodiments herein.

FIG. 5 is an example display of point-of-sale transaction data and accompanying video reviewer according to embodiments herein.

FIG. 6 is an example display of point-of-sale transaction data according to embodiments herein.

FIG. 7 is an example display of point-of-sale transaction data and accompanying video reviewer according to embodiments herein.

FIG. 8 is an example display of a commenting graphical user interface according to embodiments herein.

DETAILED DESCRIPTION

Figure 1:
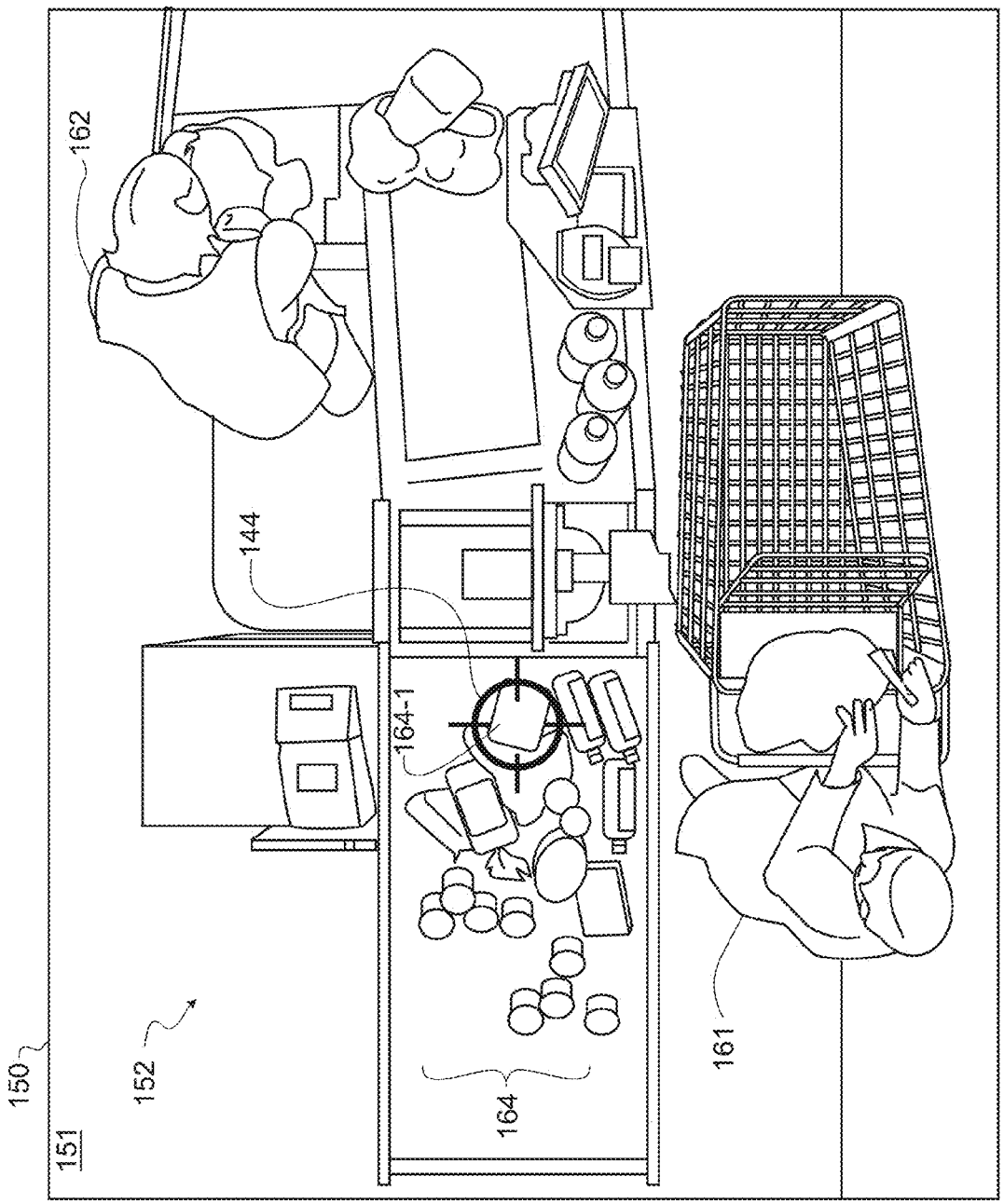
FIG. 1 is a diagram illustrating an example video frame and visual indicator according to embodiments herein.

Techniques disclosed herein include a reviewer providing random-access review of point-of-sale (POS) video, visual indicators to point to objects within the point-of-sale video, and several statistical display features. Random-access refers indexing into a video at any point, including key points of interest such as when scans occur or when other events, such as suspicious incidents and/or transaction events of interest occur. Such a reviewer can operate on archived footage as well as on real-time streams of video and transaction data.

Graphical visual indicators, random-access review, and display and filtering of transaction statistics can be embodied using a system or process that provides a heads-up display. More details on such a heads-up display are found in U.S. patent application Publication Ser. No. 12/328,419, entitled "Method And Apparatus For Random-Access Review Of Point Of Sale Transactional Video," filed Dec. 4, 2008, which patent document is hereby incorporated by reference it its entirety. Heads-up display (HUD) technology facilitates the review process. Such HUD elements can include visual indications of when point-of-sale events occurred, that is, a temporal indication. For instance, such a visual indication could include a whole-screen flash when a scan occurs, or displaying certain words or colorations over part of all of the video indicating when a suspicious event is about to occur or will occur.

Such a system, that provides random-access review of video, has three main components: the viewport, the video position information, and the event list. The viewport conveys or indicates where video and the HUD is overlaid. The video position information includes the event navigation control where relevant statistics about a currently playing video, such as frame number and timestamp, are displayed. This can include buttons and other graphical user interface (GUI) widgets used to control the play of video. The event list displays transaction item information (scans), suspicious incidents, and other points of interest. All three elements of the system are linked, so that user interaction with one, such as changing the position in the video either by clicking on an item in the event list or interacting with the event navigation control, affects what is displayed in the viewport and/or what item or items are highlighted or shown in the event list.

Techniques disclosed herein facilitate the review of point-of-sale transaction video. Embodiments include an expanded set of heads-up display (HUD) indicators that make it easy to determine when and where in a given video certain events are occurring. Additionally, the transaction video reviewer integrates into a web-based framework, greatly expanding the accessibility of video review. Web-enabling the review of video provided the benefits of IT integration and interoperability, and ubiquitous availability.

Techniques include graphical visual indicators providing HUD technologies that not only identify when an event was occurring at a particular time in the video, but also provide an indication of where spatially in the video such event occurs. This includes using a spatio-temporal visual indicator, or target, that identifies a time and a location within the video where an event of interest is or will occur.

The system can automatically derive such visual indicators through automated analysis of security video and/or using transactional information, such as transaction log (T log) data. Furthermore, such annotations can be placed manually by human reviewers, or through other means. Operators of the HUD can optionally be annotators or reviewers. The system uses "x, y, z, t" coordinates of a given transaction event of interest indicating the two-dimensional or three-dimensional location of the targeted event occurring at some time t. For example, with the automated annotation embodiment, the system can identify an item on a belt by a change in state from frame to frame, and can also reference transactional data to assist in the automated identification.

FIG. 1 is an illustration of one embodiment of a visual indicator according to embodiments herein. FIG. 1 includes a viewing region 150 for viewing video data from a given point-of-sale transaction. The displayed video frame 151 depicts point-of-sale transaction area 152 in which a customer 161 has placed various items at a point-of-sale register to be scanned by cashier 162, and subsequently purchased. In this example video frame, the visual indicator 144 is embodied as a crosshair icon, but could be alternatively embodied as a target, bulls-eye, star, arrow, and so forth. An embodiment of the visual indicator can be generically described as a target. The visual indicator 144 indicates when and where a particular event of interest is about to occur. That is, visual indicator 144 indicates a time and place within the video in which a particular event of interest will take place. The displayed or overlaid target functions as a visual indicator that assists a viewer/user to better understand or more quickly recognize points of interest in the video. In this example illustration, the visual indicator 144 indicates to the user that he or she should focus attention to a particular item 164-1 in the video that may be of interest.

A transaction event of interest can be identified as such based on several reasons or factors. For example, in a loss-prevention application, such a target or crosshair on an item can indicate that the employee or customer is about to steal the item. Targets placed within a cart/basket or over items in the cart may indicate that the employee did not scan all items in the transaction by failing to notice that items may have been left in the cart. In another non-limiting example, an operations or management application uses such an indication to highlight an item that was double-scanned by the employee, or to highlight an item that the employee handled well. For instance, a given cashier encountered a difficult item to scan, but that cashier persisted until the item was scanned. In another example, the system can help identify inventory issues. For example, a group of similar items with different barcodes might be scanned as a same item. As a specific example, ten containers of baby food are presented for purchase, there are three different flavors among the containers of baby food, but a given cashier scans all containers as the same flavor. While such an action may not result in immediate loss of revenue, this creates inventory problems, and so can also be a transaction event of interest. Visual indicators can be displayed in different shapes, sizes, colors, and orientations, with various annotations to indicate the type of item and/or incident that they are pointing out for the benefit of the user.

To further enhance the usefulness of such a visual indicator, the system can include or display animation to the target. Animating the visual indicator 144 further aids the user by further drawing the user's attention to the point of interest within the video. Such animation provides a more striking, and beneficial, HUD indicator.

Figure 2:
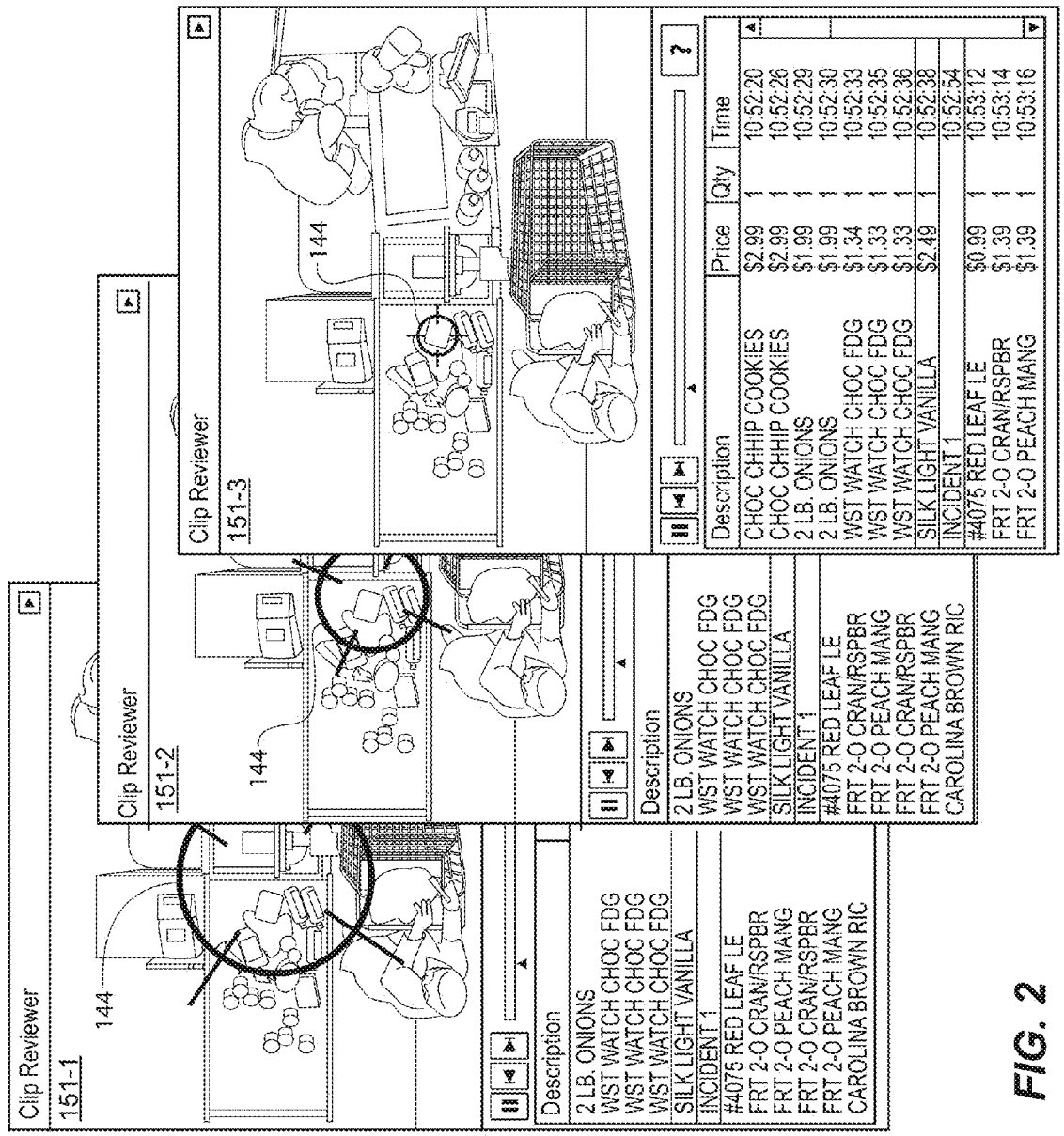
FIG. 2 is a diagram illustrating example video frames and visual indicator according to embodiments herein.

FIG. 2 is an illustration depicting animation of visual indicator 144 within a video clip reviewer. Such animation can include various motion and visual techniques to further attract a user's attention. Animation can define lead in and lead out times of the visual indicator 144 for animated targets. Other approaches can include those that are provided as part of the annotation process (whether automated or manual), as well as incorporating multiple targets animated on the screen at one time.

In this example embodiment, note that as video progresses from video frame 151-1 to 151-2 to 151-3, that visual indicator 144 progresses from a relatively large diameter crosshair to a relatively smaller diameter cross hair. For example, the visual indicator 144 displayed in video frame 151-1 is sufficient large to catch a user's eye, but also covers multiple items on the conveyor belt. In video frame 151-2, the visual indicator 144 has been reduced in size so that now only a few items fit within the circular area of the crosshair. In video frame 151-3, the visual indicator 144 has been further reduced in size so that it is now easily observed that the crosshair is marking or indicating a specific item on the conveyor belt. Such an animation technique can give the appearance of a crosshair being dropped from above onto an item. Other example animation techniques can include the visual indicator 144 quickly emerging from one side of the video frame and crossing the video before stopping over or adjacent to the item of interest. In another example animation, the visual indicator 144 appears over the item of interest, and then briefly swells in diameter or outline thickness and contracts, or displays a color change of the visual indicator 144 itself.

Animation can also be employed to track the object through a transaction event scene. This can be helpful in order to further disambiguate important actions in a given transaction event from the unimportant events. As is the case with the single point target location, the parameters of the tracking target can be derived automatically using video analysis techniques as well as through a user and/or separate annotator. Furthermore, a semi-automated approach can be taken in which the user and/or separate annotator provides a tracker with points of interest (reference points) and the automated system interpolates the points in between. In a tracking embodiment, the visual indicator 144 can follow a specific object through movement during a point-of-sale transaction. By way of a non-limiting example, visual indicator 144 can follow a given can of food as a cashier removes the can of food from one conveyor belt, moves the can of food over a point-of-sale scanning device, and places the can of food in a bagging area. Alternatively, the visual indicator 144 initially identifies an item, and then a tracking line, such as a green tail, traces a path of movement. This embodiment can be distracting to some viewers while helpful to others. Without item/object tracking engaged, the visual indicator 144 identifies a starting location of an item, then is removed from the display.

Note that, in the case of manual annotation via a user or dedicated annotator, the annotation can be provided using the process described herein or though another mechanism. When provided using a separate mechanism or through a separate party than the users of the video display, interaction between the processes described herein and the separate mechanism or party only needs to ensure compatibility of the data types associated with annotating the target animation. One advantage of a single location target, as compared to the tracking target, is that corresponding parameters are significantly more simple, allowing a practical, user-based approach to target annotation.

The spatio-temporal visual indicator disclosed herein can take on many different styles to suit various use cases. For example, a red bulls-eye or crosshair may be used to indicate suspicious items, whereas a green dot, check mark or some other neutral icon may indicate a more benign or even beneficial event is taking place.

Likewise, different animations may be used to further disambiguate event types on the HUD. For example, the animation may indicate a suspicious event taking place on a conveyor belt and involving the employee.

Other embodiments include more complex spatio-temporal indicators to show more complex relationships between objects within the video. For instance, a HUD indicator may highlight the customer, the shopping cart, and an item in the cart, along with arrows connecting them. This may indicate that the customer is attempting to hide the item from view of the cashier, hoping that the cashier may not notice the item or items and hence not scan those items.

Another type of spatio-temporal indicator is a "magnifying lens" effect. In this indicator, the spatio-temporal location is highlighted to the user through the use of local magnification, making the region of interest clear thereby further helping the user understand the more salient parts of the transactional video.

Note also that the above is in no way an exhaustive set of possible use cases and types of animated or static spatio-temporal HUD visual indicators. Rather, the above provides reference uses for the concept or functionality of such indicators.

In addition to graphics and animation, indicators may also include annotation and/or speech, sound, image, and haptic feedback (such as a vibration, when used via a mobile phone) to further highlight and disambiguate event information. For example, an annotation accompanying a target may read "ticket switching" indicating an item whose image does not match the SKU (Stock-keeping unit) entered in to the POS (either by bar code scan or manual hand entry). Such an accompanying textual annotation can be rendered as a text bubble next to the item of interest. In order to further aid the user, the target may be accompanied by a small thumbnail image of what the entered SKU's item actually looks like. This kind of "just-in-time" display of relevant information makes the user very efficient. Importantly, this kind of relevant context sensitive information may also be displayed in other parts of the user interface, not only with the target.

In addition to overlaid visual indicators, the user interface can employ varying levels of playback speed as a means of both drawing attention to an event of interest and enabling the user to better examine the event of interest. For example, the user interface may automatically pause and/or slow down playback of the video just prior to the event occurring. A target may be used in conjunction with such a pause or slow-down to highlight an item of interest. The video may then be played back at a slower speed through the duration of the event in order to allow the user to more clearly view what takes place. After the period of interest has passed, the playback could resume normal speed.

In addition to the above embodiment, numerous other variations of playback speed are possible. Another embodiment, for example, can have a default playback speed that is faster than realtime (to speed through the uninteresting parts) slowing down only for the events of interest. Likewise, yet another embodiment includes playback at regular realtime speed all the time, pausing only to display a target, and then resuming at regular speed through the duration of the event as well as throughout the remainder of the video. The system also provides manual, user-controlled and user-customized playback speed settings.

Playback speed control combined with the random-access functionality of the reviewer allows for sophisticated and useful user interactions. For example, "instant replay" functionality can be employed by the user for replaying previous segments of video just reviewed. Such replay is useful to review a complex or detailed segment of video that contains a rich or complex set of action that needs detailed or focused reviewing. Such functionality can exist independent of the content—i.e. replay the last few seconds of video. Such functionality can also exist with knowledge of the content—i.e. replay since the last event in the event list, or replay since the last event of interest in the event list. Various combinations can be employed to provide a rich user experience.

The system includes providing a video clip reviewer and/or HUD over the Internet and other networks. Enabling access for review of transaction video over existing communication networks minimizes the impact on corporate networks and the integrations steps necessary to install and maintain the reviewer in corporate networks by using such widely-available and widely-approved tools such as web browsers and streaming video.

A web-based ubiquitous review begins with authentication. The following authentication is an example of how users may authenticate with the reviewer to identify themselves and gain access to the incidents/transaction events of interest and video to which they are permitted. Other authentication schemes involve using biometrics or hardware-based identification devices for added security. Once logged in, the user is presented with a hierarchical display of information to help the user organize the user's actions across hundreds or thousands of organization units (such as stores, for example) in a comprehensive and intuitive way. An example embodiment of such a view is illustrated in FIG. 3.

FIG. 3 is a screen shot illustration of a hierarchical display that helps the user efficiently navigate through hundreds and thousands of cases. In this top-level display, transactions and incidents are organized across multiple stores. Some columns of interest are shown, including number of incidents added today, total number of incidents and those still left to be reviewed. Other summary statistics beneficial to the user can also be displayed to help them drill down and organize actions across a large data set.

Once a store is selected, incidents (transaction events of interest) are shown for that selected store. FIG. 4 is an example screen shot of a graphical user interface showing a list of incidents associated with a selected store within a web-based reviewer application showing a paginated list of incidents 402 and the streaming HUD-enabled video player 405. List of incidents 402 can be a list of incidents to be reviewed as well as the reviewer application itself. The pagination and listing by cashier provides an efficient and quick browser-based user interface. Once a particular transaction is selected for review, the video and associated content (i.e. the events of the transactions) are streamed to the user via video clip reviewer 405.

Figure 5:
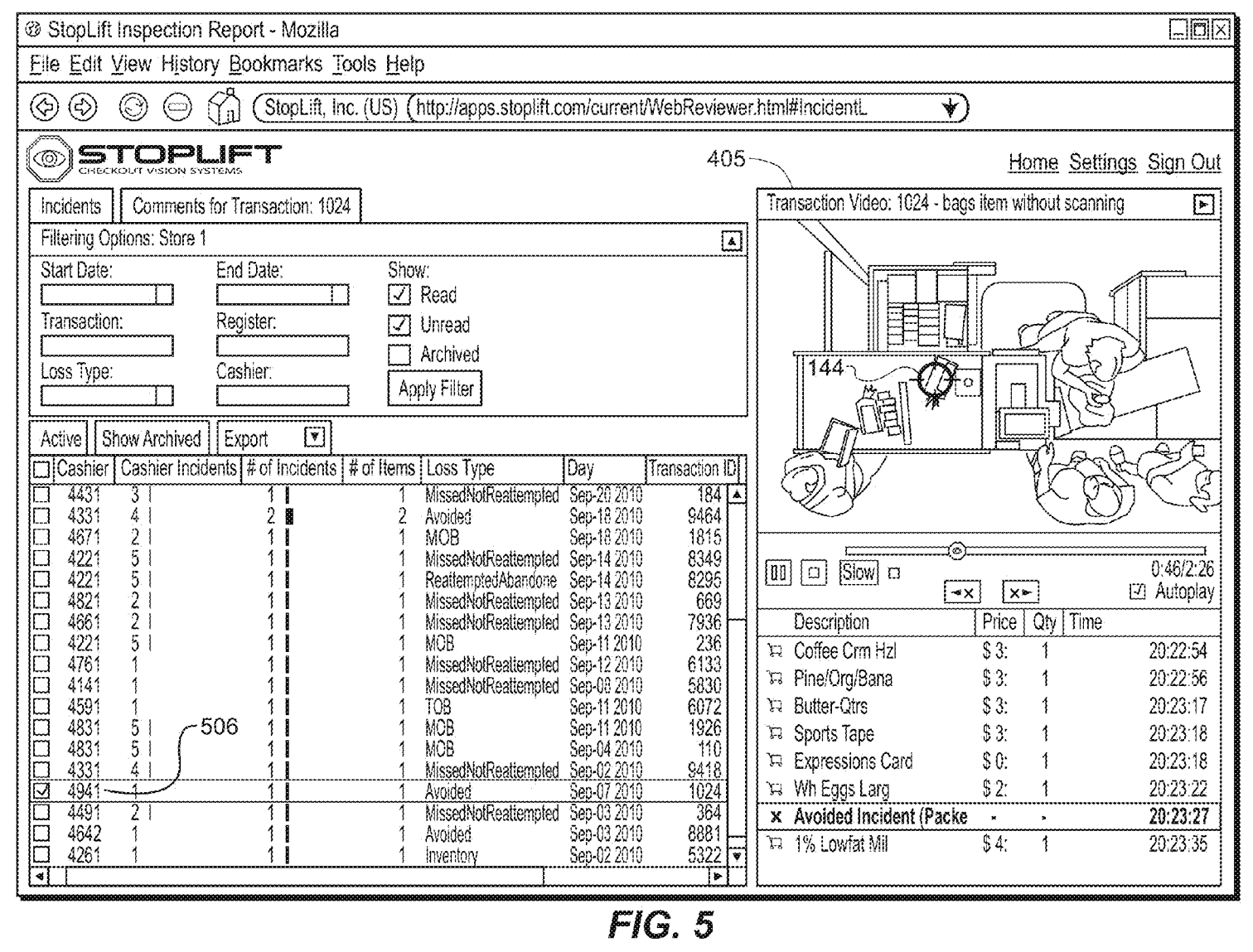

FIG. 5 is an example screen shot of a web-reviewer displaying a selected transaction 506. In this example, the selected transaction is identified as involving cashier 4941. The displayed reviewer application displays an event list, navigation controls, and a viewport to view a selected transaction via the HUD display, with controls linked to transactions and transaction events. The video displayed within clip reviewer 405 can be streamed, thereby providing a more compelling user interface by allowing the user to begin transaction review before the entire video is downloaded. Random-access across the entire transaction is enabled, even if a given portion of the video has yet to be downloaded. In this case, the system can initiate a new video stream at a selected point. Additionally, streams can be downloading in the background starting at points of interest predicted by the web application. For instance, while the entire video may download and be presented to the user, another video may be downloaded in the background beginning at the first incident, as this is a likely use case in a loss-prevention application. In this way, a compelling user experience is maintained without waiting to download the entire video.

In addition to the high-level incident navigation, techniques herein also include processes for grouping incidents by a certain common property, such as by a cashier. This grouping enables investigators to make quicker decisions about how to proceed with the incidents. For example an investigator might only choose a cashier considered as an egregious cashier, and only investigate his/her incidents. This saves the investigator valuable time. This presentation of information also helps in comparing loss information between two entities such as two registers. For example investigators can compare the loss between self-checkout registers, express registers, high-volume, and low-volume registers, and so forth.

FIG. 6 illustrates example displays of high-level grouping to depict different ways that the information can be grouped to provide a high-level view enabling the user to drill down into the information that he or she seeks. Additional embodiments for presenting the user with information can include filtering transactions based on one or more of the properties of the transaction and using a tree view to drill down into different sub components. Accordingly, FIG. 6 shows a transaction list group according to identified registers.

Figure 7:
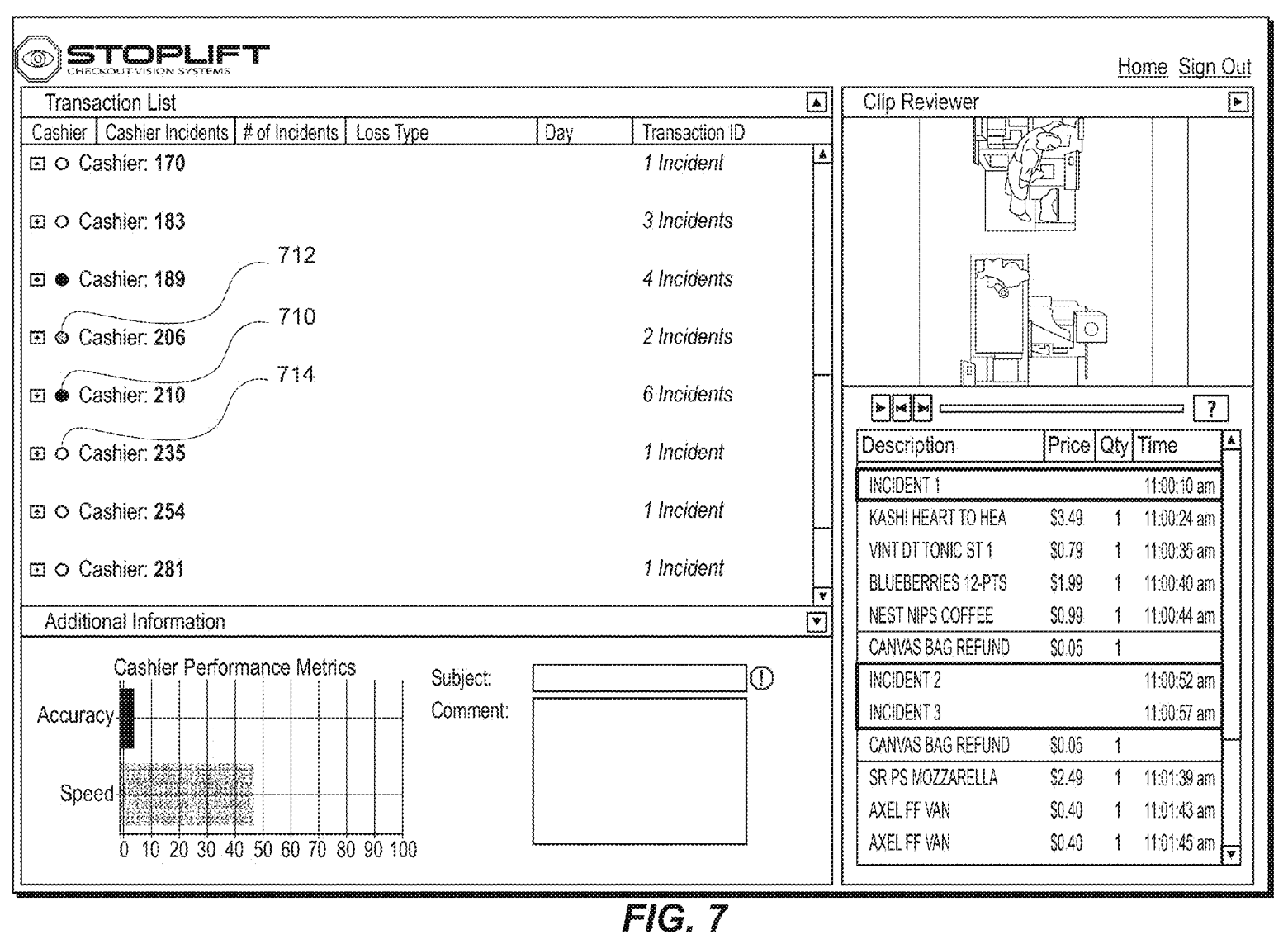

FIG. 7 illustrates high-level grouping by identified cashiers. Once incidents are grouped into a common category, the user interface provides summary information about that particular group. For example, for grouping incidents by cashier, the interface provides a status icon next to the cashier. In this non-limiting example, the user interface uses color to indicate status or performance of cashiers, such as by using red icon 712 (depicted as a solid circle), yellow icon 710 (depicted as a hatched circle), and green icon 714 (depicted as an open circle or circle outline). In this example, red icon 712 indicates that the cashier 210 is an egregious cashier who has numerous incidents making that cashier a prime target for an investigation. Yellow icon 710 indicates that this cashier 206 has relatively fewer incidents and indicates that an investigator might need to coach or retrain that cashier, and green icon 714 indicates that this cashier 235 has only a minor number of incidents.

Other information may also be provided in this calculation such as amount of time worked, cashier speed, etc. In addition to, or in place of, using color, such visual indicators can use a geometric shape and size to convey a magnitude or quantity of incidents. For example, each cashier or incident count can be depicted with a bar having a size or length representing a magnitude of associated transaction events of interest. High-level grouping, as described herein, provides a way of presenting incidents based on other factors in addition to or in place of such store groupings, such as (but not limited to) by register, cashier, day, or incident type. When clicking on a cashier row or an incident row below that cashier, a graph panel populates below the cashier/incident list with more detailed metrics such as accuracy and scan rate or speed.

The web-based reviewer can further provide summary statistics relevant to a given selected group. For example, in a store grouping of suspicious incidents or transaction events of interest, the user interface may present the user with statistics relevant to each store as a whole, such as by displaying a total number of suspicious transactions, number of suspicious cashiers, store volume, etc. For register level grouping, the web-based reviewer can present or display statistics such as volume at that register, volume of that register as compared to other registers, and/or as compared to other similarly configured registers (two belts, self checkout, bagger present, etc.). For cashier groupings, the web-based reviewer may present statistics on each cashier such as scan rate, error rate, theft rate, total number of un-scanned items detected, etc.

The web-based reviewer can further display bar graphs showing various statistics such as cashier speed and accuracy percentile, calculated by the selected employee compared to the rest of the cashier population. These statistics can be calculated by measuring the time between scans or taking the total number of scans and dividing by the total time the transaction took to complete from the very first item that was scanned. The accuracy can be determined using a sweetheart-ing and/or basket-based loss detection system. Other embodiments can include using void statistics of rescan statistics.

The HUD can also display cashier performance metrics. Cashiers can be compared against their peers using a two-axis graph. Such a grouping display enables quick comparison of cashiers to peers, based on selected metrics. For example, such metrics can include scan rate (speed) and scan accuracy. In embodiments where the graph is a scatter plot, each dot can represent a unique cashier. Placement of dots on the graph indicates how fast and how accurate that cashier is at scanning. The speed of a cashier can be determined by examining transaction log data for each cashier. Corresponding accuracy can be determined based on the output of a loss analysis engine capable of detecting missed scans such as that described in U.S. Pat. No. 7,631,808, which is incorporated herein by reference. In a scatter plot having four sectors, a given cashier can be identified as (1) slow and inaccurate, (2) fast, but inaccurate (3) slow, but accurate, and (4) fast and accurate. The best cashiers have high scan rates and high accuracy (low miss rate). Correspondingly, those cashiers that are slow and inaccurate are the least effective cashiers, having both low scan rates and poor accuracy.

Another form of employee comparison graph is a one-dimensional comparison. In one embodiment, the axis of comparison is the loss rate metric. In this style of graph, the second metric, scan rate, is omitted, and cashiers can be sorted from best performers to worst performers.

Figure 8:
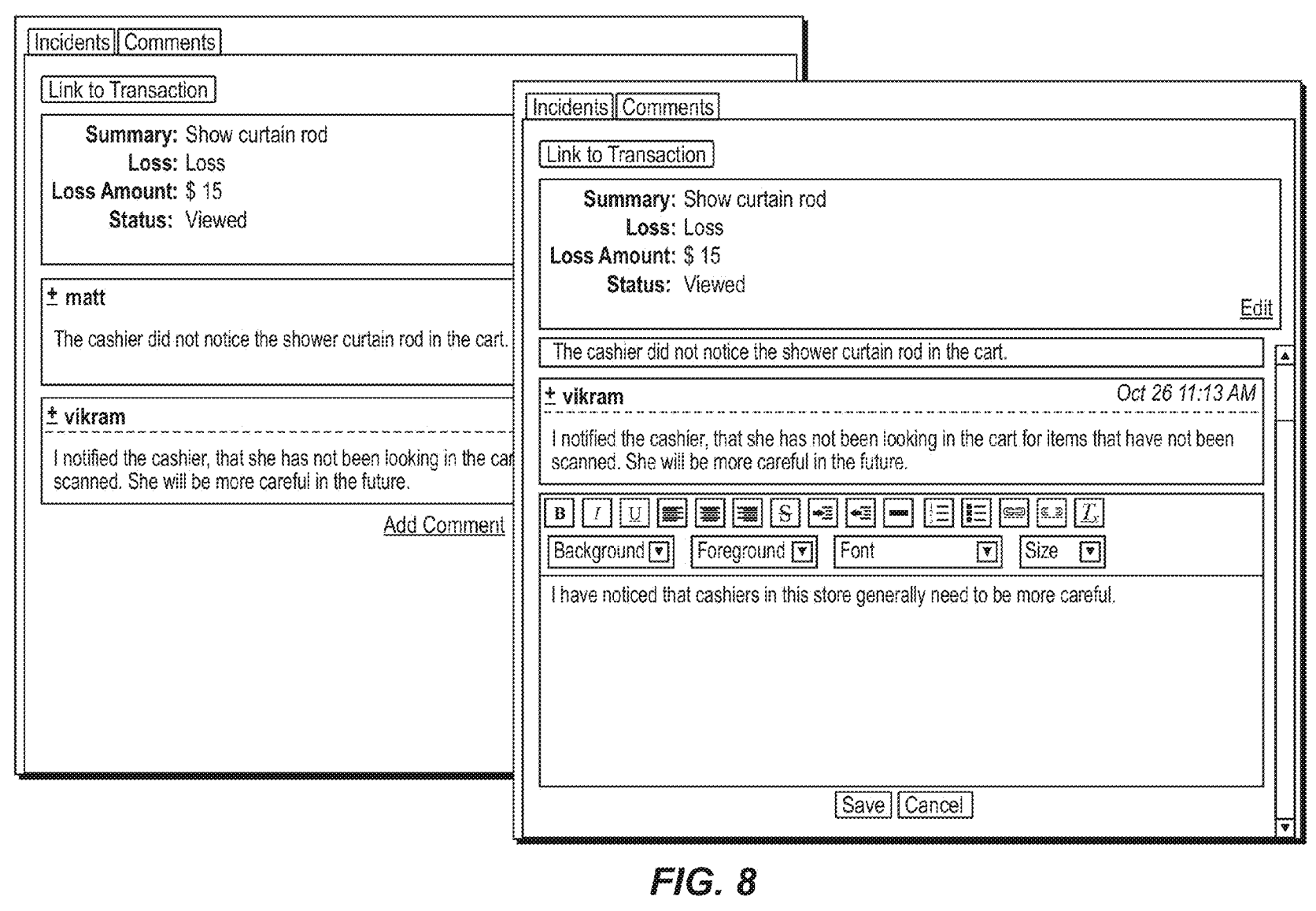

The web-based reviewer further provides commenting functionality, to provide rich or detailed user feedback. Such feedback consists of the ability to annotate the transaction video or transaction list or transaction event in order to record data the user or users wish to associate with the transaction. This type of information takes two forms: structured and unstructured. FIG. 8 depicts an illustration of two commenting windows for composing and viewing comments associated with transaction data. Commenting functionality can include various modes of data input, such as structured, field-based annotations, and unstructured, blog-style annotations. Structured information consists of standard fields that the user may interact with to provide feedback. These include the ability to label such things as whether the transaction contains loss or no loss, and if there is a loss, then what is the loss value. Numerous structured annotations are available including (but not limited to) flagging the transaction for following up, highlighting the transaction, giving the transaction a score or rating, marking the transaction as viewed/unreviewed, marking the transaction as archived, etc.

Techniques can also include playing a video summary showing only transaction events of interest. For example, such a feature processes a transaction video by segmenting the video according to periods of time before and after an event of interest. The system then plays those segments or chunks back-to-back and/or sequentially, thereby skipping the parts of the transaction that can be considered boring or unimportant.

Thus, such a summary mode speeds up review of video by eliminating normal, or uninteresting, portions of the video from review while keeping the interesting or relevant parts. This can be accomplished by first determining areas of time surrounding each transaction event of interest. Such areas can then be stitched together or played back in succession. Video segments, however, do not need to be played back in the same order in which they appeared in the original video. For example, the video segments can be reordered according to (but not limited to) the types of events occurring in the transaction, such as by putting all like events together to facilitate review or to present possible loss events before no-loss events. The summary video can also auto-repeat, to further help review.

Determining areas of time surrounding each transaction event of interest can be done in a number of ways. For example, if the transaction event is an event marked by a singular point in time, then predefined boundaries can be specified to bracket such an event. The boundaries can be predefined based on the type or content of the event of interest, in order to specify different bracketing periods depending on the type of event. For example, an event that indicates a cash drawer opening may need a large pre-event time bracket, and a smaller post-event time bracket in order to establish a context in which a decision of fraudulent activity can be conclusively made. However, a void event may require a small pre-event bracket and a larger post-event bracket to satisfy the same requirement.

An event of interest marked by a start time and an end time may be sufficient in and of itself to be used as the time bracket. Additional boundaries, however, can likewise be put on the start time and end time according a similar set of circumstances as outlined above. Note that this is not an exhaustive list of ways to bracket events of interest. Indeed, events of interest identified or marked by other temporal functions, and can also be bracketed accordingly.

Figure 9:
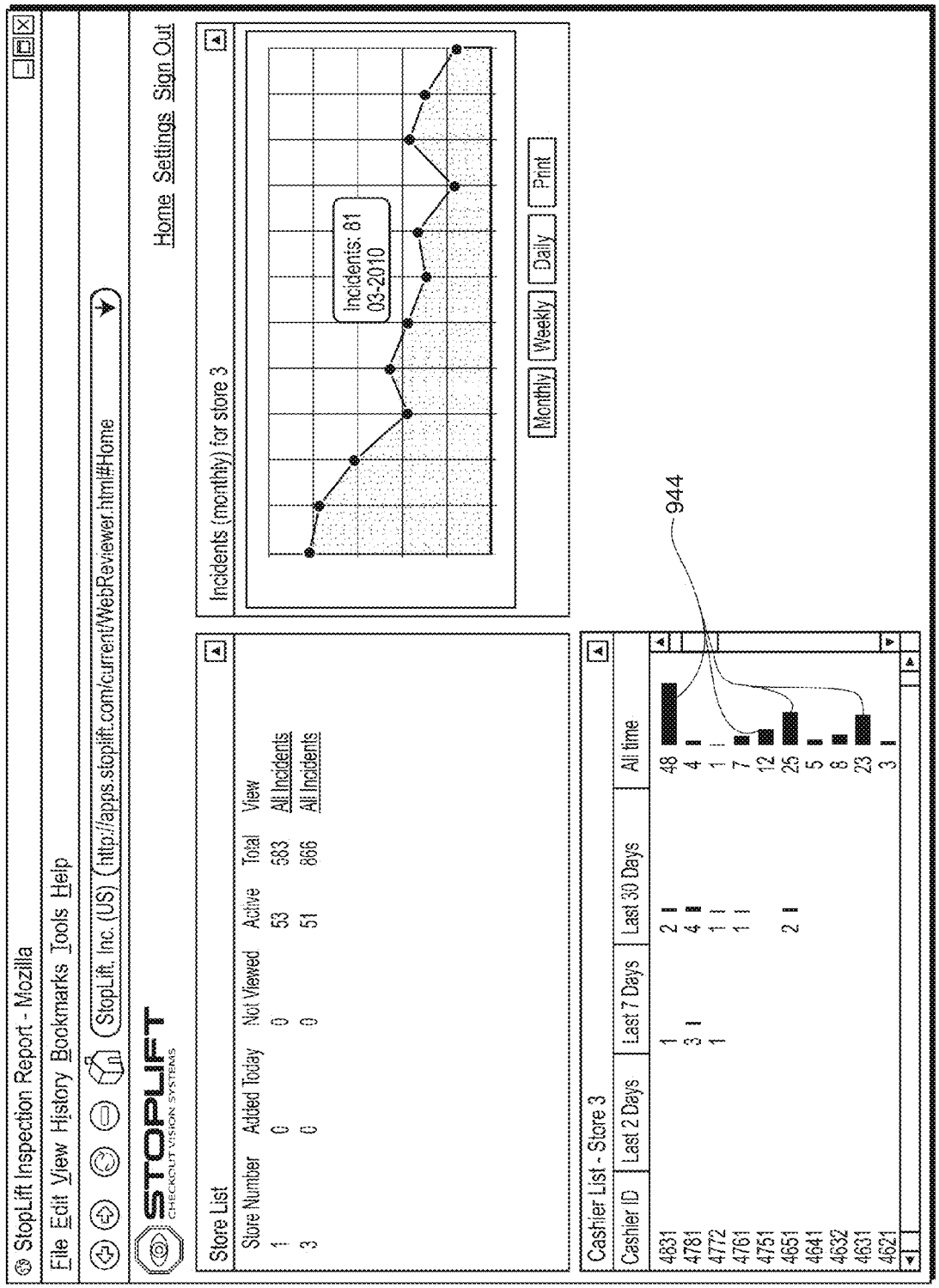
FIG. 9 is an example display of point-of-sale transaction data according to embodiments herein.

FIG. 9 is an example screenshot of a statistical display of transaction event data. Note the FIG. 9 includes several modules or regions, including one module or window for displaying a store list and transaction events of interest, or incidents, relating to that store list. Another window displays an interactive graph having selectable nodes. By selecting a given node, or using a pointing device to "hover" over a given node, the data manager can display a number of incidents and a corresponding date, such as in a popup icon or bubble. Another window displays a cashier list for a given store, listing incident statistics associated with each listed cashier. Note that statistical visual indicators 944 are embodied as bars of various lengths. The length or size of statistical visual indicators 944 represents a magnitude or quantity of transaction events of interest associated with respective cashiers.

Figure 13:
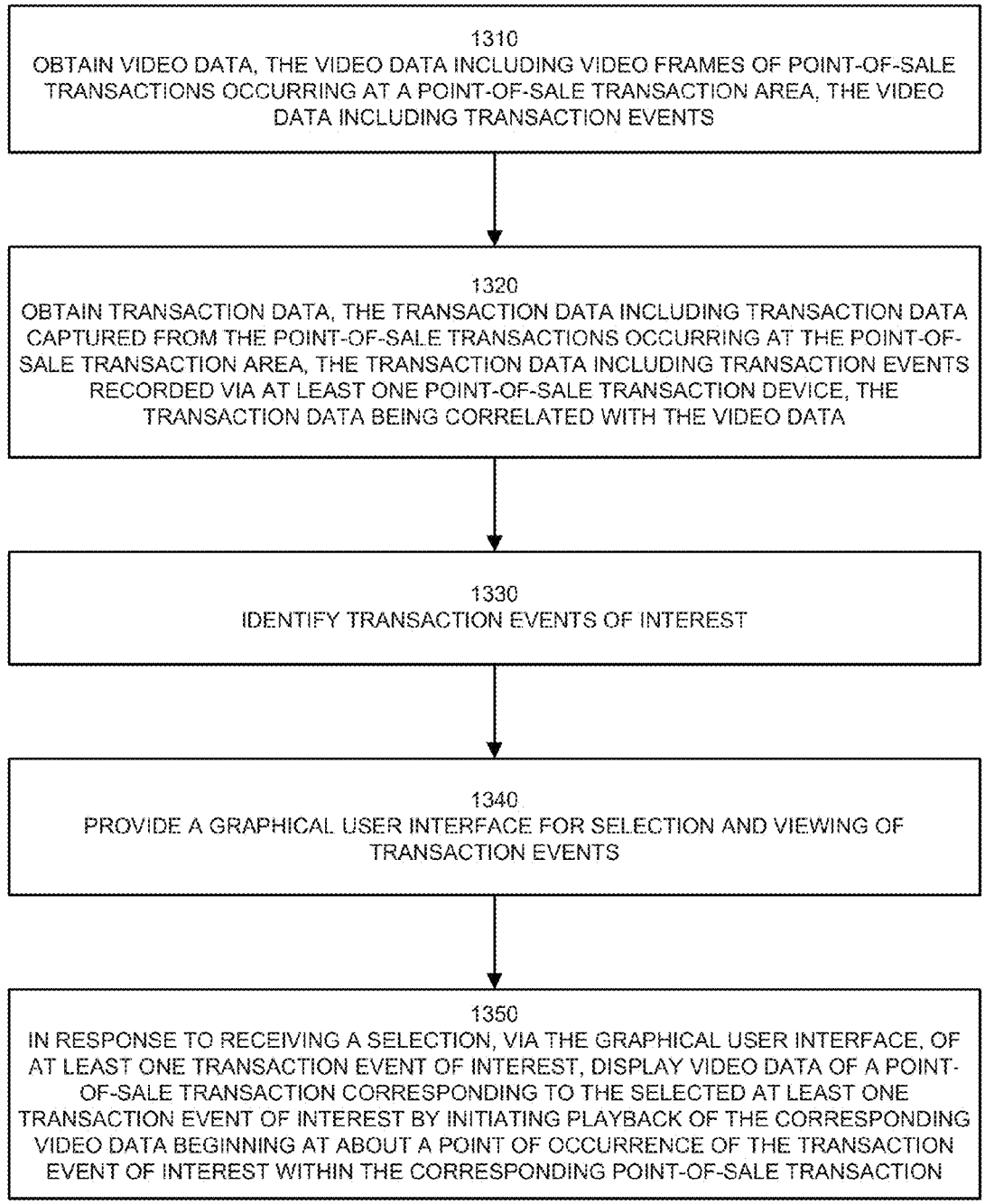
Figure 14:
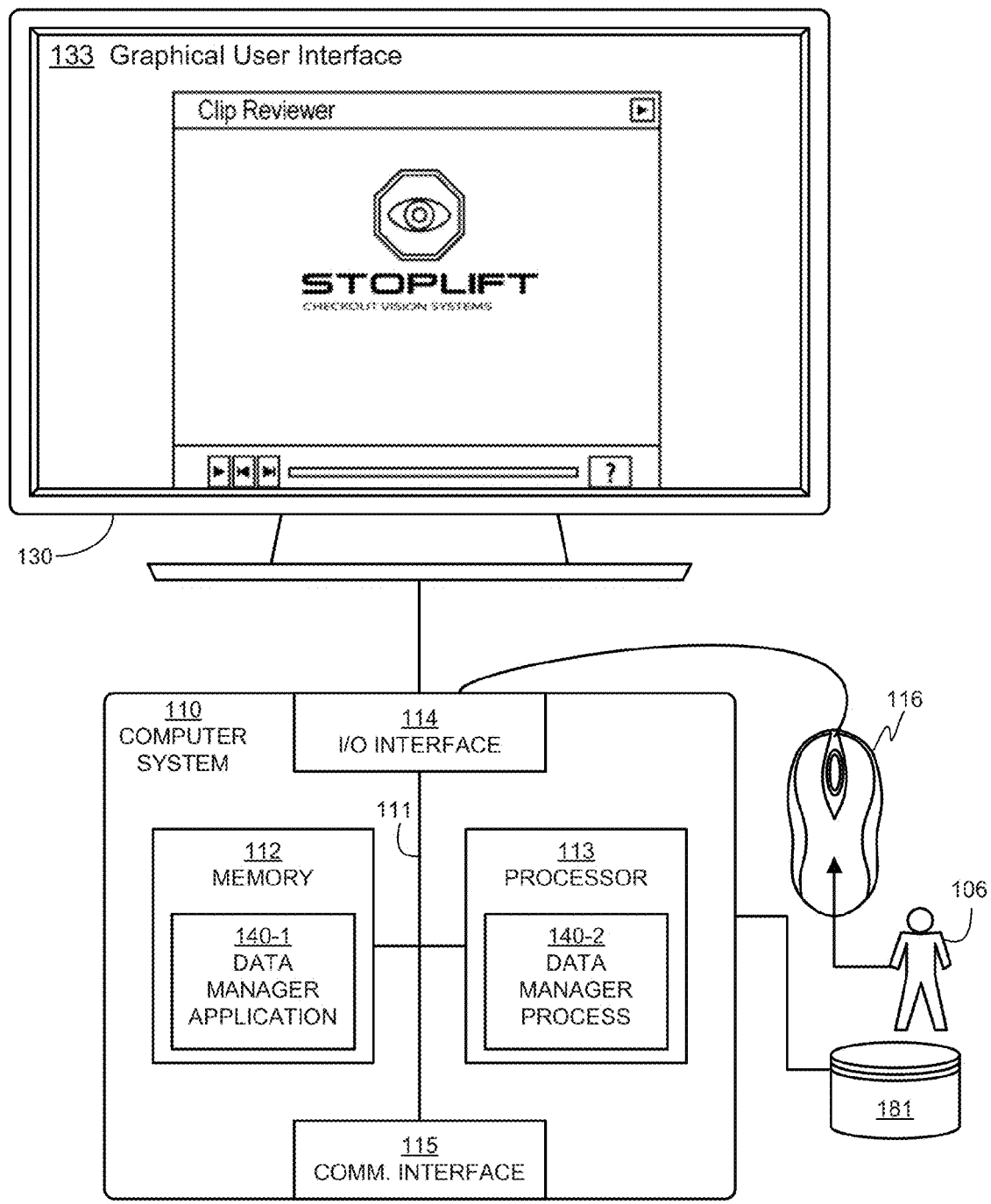
FIG. 14 is an example block diagram of a data manager operating in a computer/network environment according to embodiments herein.

FIG. 14 illustrates an example block diagram of a data manager 140 operating in a computer/network environment according to embodiments herein. Generally, FIG. 1 shows computer system 110 displaying a graphical user interface 133 that provides a web-based reviewer interface. Computer system hardware aspects of FIG. 14 will be described in more detail following a description of the flow charts. Functionality associated with data manager 140 will now be discussed via flowcharts and diagrams in FIG. 10 through FIG. 13. For purposes of the following discussion, the data manager 140 or other appropriate entity performs steps in the flowcharts.

Figure 10:
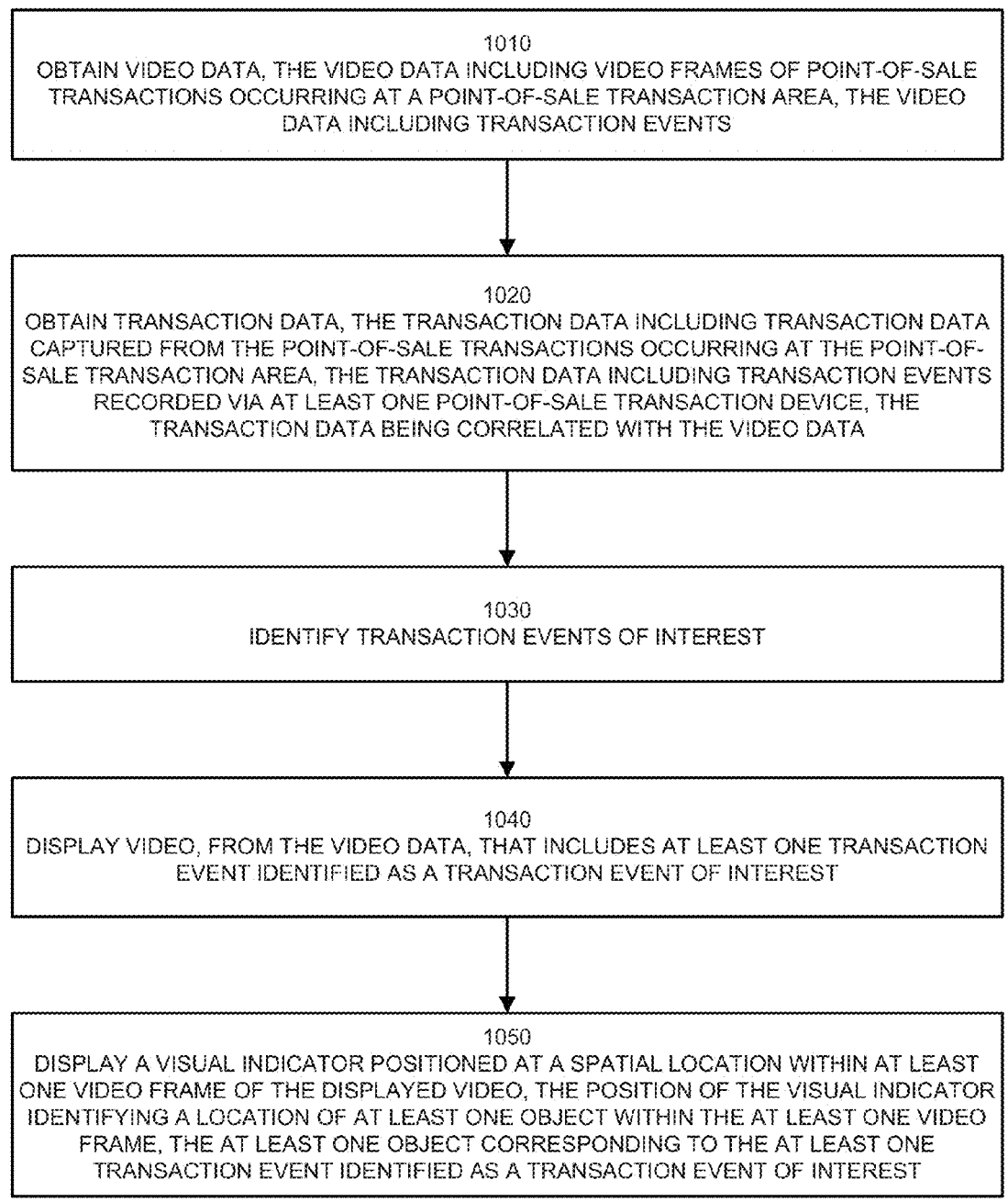
FIGS. 10-13 are flowcharts illustrating examples of processes supporting data management operations according to embodiments herein.

Now describing embodiments more specifically, FIG. 10 is a flow chart illustrating embodiments disclosed herein.

In step 1010 data manager 140 obtains video data. The video data includes video frames of point-of-sale transactions occurring at a point-of-sale transaction area. The video data includes transaction events. That is, the video data contains video content of point-of-sale transactions. The video data can be captured via the use of one or more video cameras such as overhead video surveillance cameras.

In step 1020, data manager 140 obtains transaction data. The transaction data includes transaction data captured from the point-of-sale transactions occurring at the point-of-sale transaction area. The transaction data includes transaction events recorded via at least one point-of-sale transaction device, such as a scanning device. The transaction data is correlated with the video data. In some embodiments, the data manager 140 itself can obtain or receive the video data and the transaction data separately, and then correlate the two types of data. In other embodiments, data manager 140 obtains or receives such two types of data in a correlated state.

In step 1030, the data manager 140 identifies transaction events of interest. The data manager 140 can use any of several techniques to identify such transaction events. For example, the data manager 140 can identify transaction events of interest based on an analysis of the transaction data and/or an analysis of the video data. Transaction events of interest can be predetermined based on any criteria, based on a specific listing of types of transaction events, based on transaction events having certain characteristics, etc. In other words, transaction events of interest, also known as incidents, can include intentional monetary loss, unintentional monetary loss, gaps of a predetermined length between scans, scans of specific items, cashier successes, inventory issues, and so forth.

In step 1040, the data manager 140 displays video, from the video data, that includes at least one transaction event identified as a transaction event of interest. In other words, the data manager 140 can play video of a transaction event having a potential loss or identified incident of interest.

In step 1050, the data manager 140 displays a visual indicator positioned at a spatial location within at least one video frame of the displayed video. The position of the visual indicator identifies a location of at least one object within the at least one video frame. The at least one object corresponds to the transaction event identified as a transaction event of interest. For example, the data manager 140 can display a graphical icon or shape within one or more video frames themselves as a means of identifying or pointing out a corresponding item or object associated with the transaction event of interest. Such a visual indicator can be positioned on top of or adjacent to a given item. If the visual indicator is placed adjacent to the item, then the visual indicator can use geometry and/or orientation as a means of identifying the specific item. The data manager 140 can overlay such a visual indicator on frames of video data, integrate the visual indicator with the video data itself, or use another data processing mechanism to modify the video data or cause a visual indicator to be displayed at a particular spatial and temporal location within the video data.

Figure 11:
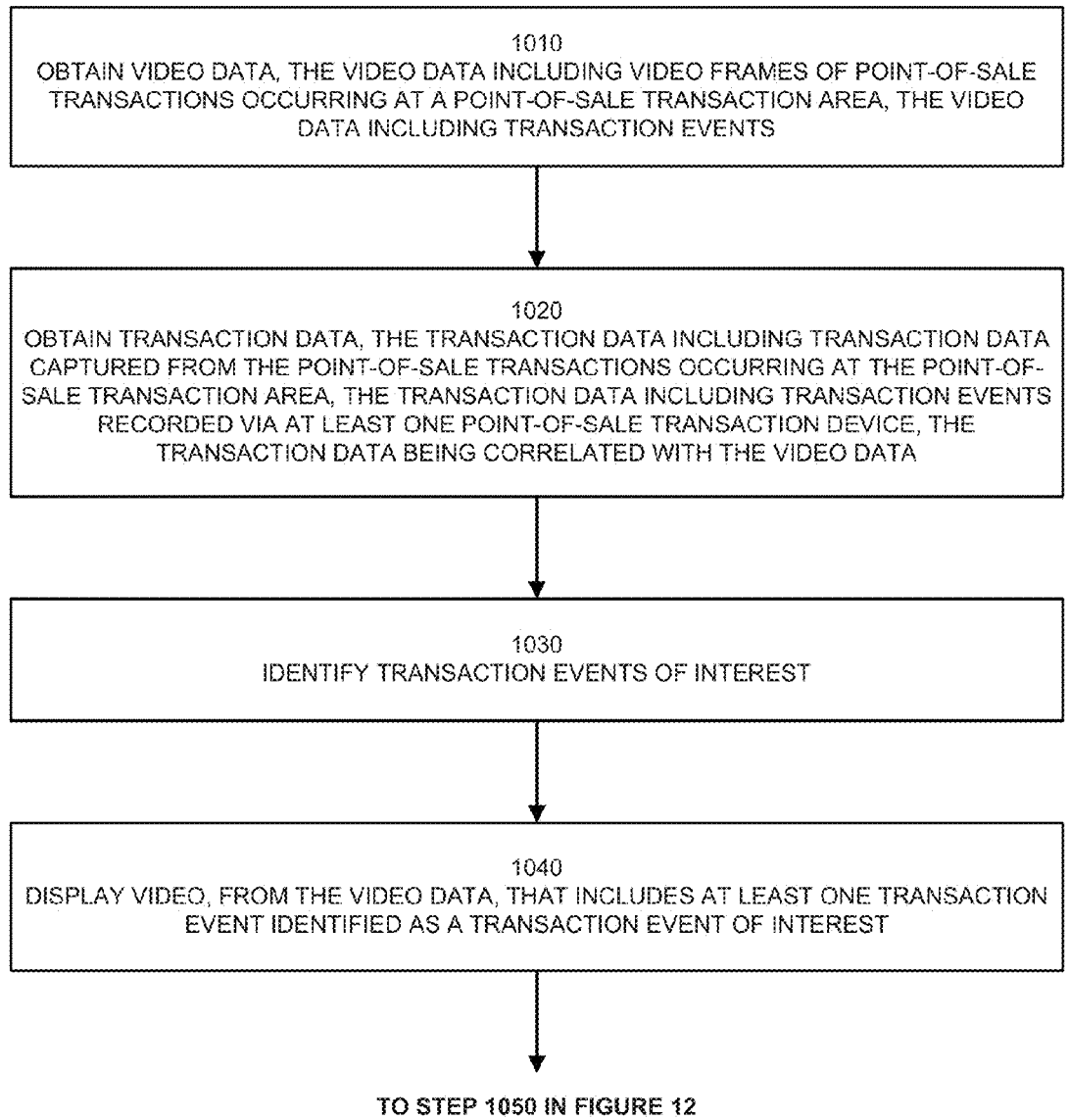
Figure 12:
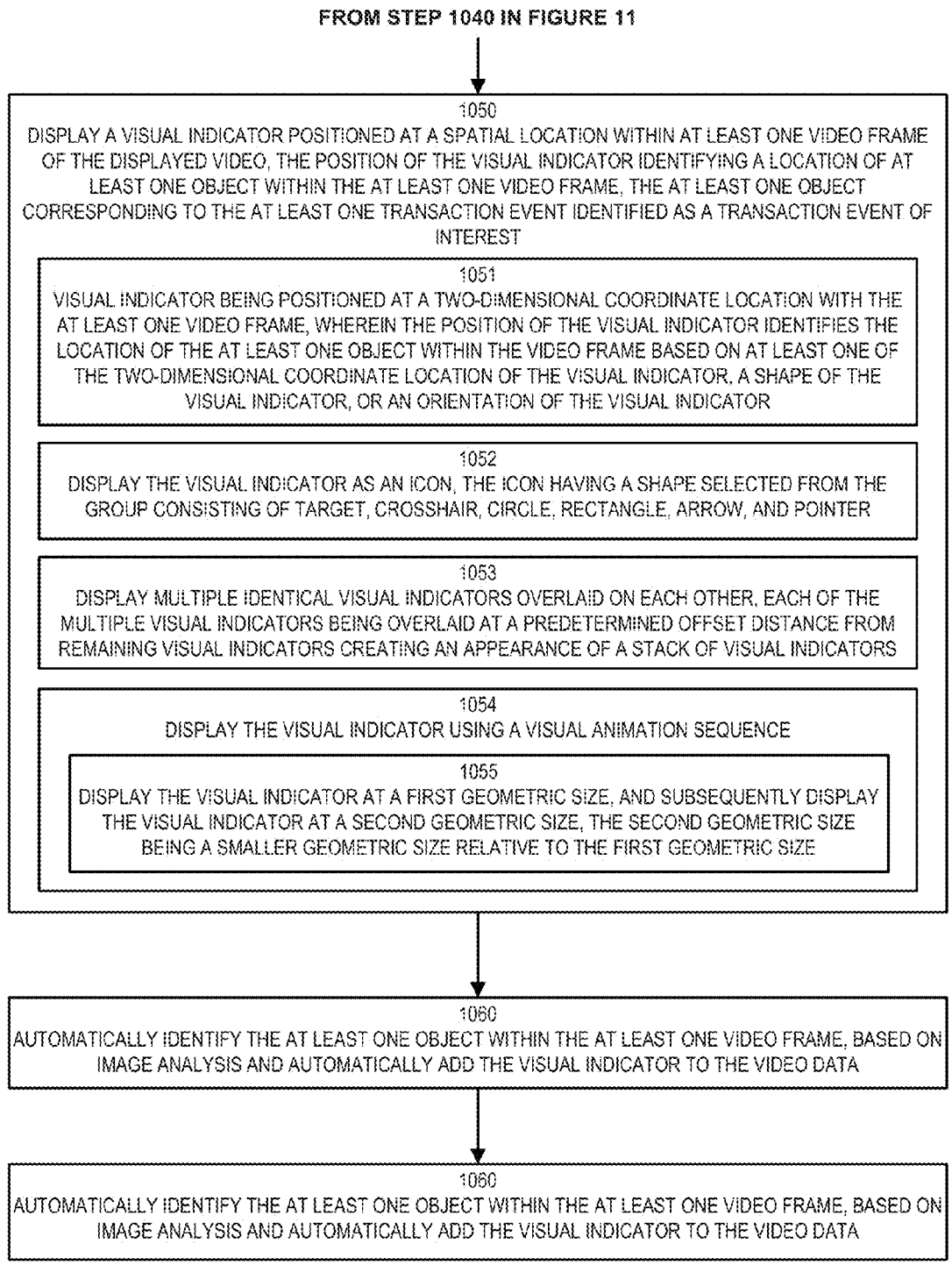

FIGS. 11-13 include flow charts illustrating additional and/or alternative embodiments and optional functionality of the data manager 140 as disclosed herein.

In step 1010 data manager 140 obtains video data. The video data includes video frames of point-of-sale transactions occurring at a point-of-sale transaction area. The video data includes transaction events.

In step 1020, data manager 140 obtains transaction data. The transaction data includes transaction data captured from the point-of-sale transactions occurring at the point-of-sale transaction area. The transaction data includes transaction events recorded via at least one point-of-sale transaction device. The transaction data is correlated with the video data. The transaction data can be captured separately from the video data. For example, a video camera can be used to capture the video data, while a bar code scanner and cash register are used to capture the transaction data.

In step 1030, the data manager 140 identifies transaction events of interest.

In step 1040, the data manager 140 displays video, from the video data, that includes at least one transaction event identified as a transaction event of interest.

In step 1050, the data manager 140 displays a visual indicator positioned at a spatial location within at least one video frame of the displayed video. The position of the visual indicator identifies a location of at least one object within the at least one video frame. The at least one object corresponds to the transaction event identified as a transaction event of interest.

In step 1051, the data manager 140 positions the visual indicator at a two-dimensional coordinate location with the at least one video frame. The position of the visual indicator identifies the location of the at least one object within the video frame based on at least one of the two-dimensional coordinate location of the visual indicator, a shape of the visual indicator, and an orientation of the visual indicator. Thus, the visual indicator functions to draw a viewer's attention to a specific area within a display screen or within displayed video data. By positioning the visual indicator at a particular coordinate location, the viewer can quickly locate a subject item of a particular transaction or scan. Note that the data manager 140 can use any combination of location, shape of the visual indicator, and orientation of the visual indicator to identify the location of the object within the video frame. For example, if the visual indicator were embodied graphically as an arrowhead, then such an arrowhead can be oriented and positioned to point to a specific object, and most likely positioned adjacent to or near the object. In another example, if the visual indicator were embodied graphically as a circle or crosshair, then the data manager can position such a circular icon directly over the object of interest.

In step 1052, the data manager 140 displays the visual indicator as an icon. This icon can have a shape, for example, having an appearance of target, crosshair, circle, rectangle, polygon, arrow, or pointer. Thus the visual indicator can be embodied using any of several different graphical designs.

In step 1053, the data manager displays multiple visual indicators overlaid on each other, with each of the multiple visual indicators being overlaid at offset distances from remaining visual indicators thereby creating an appearance of a stack of visual indicators. The multiple visual indicators can be identical or different. For example, a given transaction event of interest might correspond to a stack of four individually wrapped slices of flank steak, on a conveyor belt of a retail grocery store. In this particular example transaction, an attending cashier grabs the four items of flank steak as a stack to move to a bagging area. In this example situation, the data manager 140 can display four visual indicators each offset by a relatively small amount to provide a visual appearance of a stack of visual indicators. The appearance of such a stack or group of visual indicators quickly and visually conveys to a viewer that the corresponding transaction event of interest involves multiple objects or items within the transaction.

In step 1054, the data manager 140 displays the visual indicator using a visual animation sequence. Thus, in addition to simply having an appearance of a visual indicator at a specific place and time within the video data, the data manager 140 can use one or more visual animation effects to further draw a user's attention to a specific area.

In step 1055, the data manager 140 displays the visual indicator at a first geometric size, and subsequently displays the visual indicator at a second geometric size, with the second geometric size being a smaller geometric size relative to the first geometric size. Such an animation effect can be described as a drop-down effect to help quickly focus or zero in on a specific location within a video frame.

In step 1060, the data manager automatically identifies the at least one object within the at least one video frame, based on image analysis (and/or analysis of transaction data) and automatically adds the visual indicator to the video data. Thus, the data manager 140 can use automated software processes to graphically examine video data and to include and/or display visual indicators within the video data.

In step 1070, the data manager 140 receives manual input via a graphical user interface of the displayed video. The manual input indicates the location of at least one object within the video frame(s). In response to receiving the manual input, the data manager 140 positions the visual indicator within the video frame(s) at the spatial location identifying the location of the object. In one example embodiment, an individual reviews video data having potential transaction events of interest. Upon identifying or concluding that a particular transaction event is of interest, the individual can click on an area of the video data, or otherwise indicate a coordinate location to add a target or visual indicator to the video data at a specific place and time within the video data.

Data manager 140, and the visual indicator, includes several additional and/or alternative embodiments. For example, the visual indicator can be displayed to identify a location of the object within a shopping cart, basket, flat bed cart, or other item carrier. The data manager 140 can display a textual annotation in addition to the visual indicator. Such a textual annotation can be used to indicate an identified characteristic of the transaction event of interest, or an identified characteristic of the corresponding object being indicated.

The data manager 140 can also display multiple visual indicators, with each of the multiple visual indicators spatially positioned within the video frame to identify separate objects within the video frame. For example, certain transaction events can involve multiple objects and or multiple individuals, such that using multiple visual indicators further assists a viewer in identifying the important objects within a particular transaction event of interest. The data manager 140 can display the visual indicator using a predetermined color. This predetermined color can represent or identify a specific type of transaction event of interest. For example, a green visual indicator can identify a transaction event involving no loss, while a red visual indicator can convey or communicate a point-of-sale loss or potential loss.

In another embodiment, the data manager 140 magnifies a region of interest on the video frame of the displayed video. This region of interest includes the object. For example, local magnification is used within a specific area of a video frame or video clip reviewer to further draw a viewer's attention or assist in viewing objects of interest.

Other embodiments include using one or more non-visual indicators in connection with displaying the visual indicator. The non-visual indicators identify occurrence of the transaction event identified as a transaction event of interest, similar to the visual indicators. The data manager 140 can use various non-visual indicators such as audible sound, spoken audio, and haptic indicator. The data manager 140 can also modify playback speed of video data, such as by playing video, of the transaction event identified as a transaction event of interest, at a first playback speed, and playing video of remaining transaction events at a second playback speed. That is, the first playback speed is slower than the second playback speed.

In other embodiments, the data manager 140 displays transactions with transaction events of interest grouped according to at least one predetermined basis. The grouped transactions with transaction events of interest can be displayed within a first viewing region of a graphical user interface. The data manager 140, in response to receiving a selection of a specific transaction with at least one transaction event of interest, displays corresponding video data within a second viewing region of the graphical user interface. In other words, the data manager can provide a web-reviewer for simultaneously viewing and navigating transaction events displayed as text or links, and an adjoining or adjacent region or window in which corresponding video data is played. Alternatively, the data manager 140 displays transaction events of interest grouped according to at least one predetermined basis, the grouped transaction events of interest displayed within a first viewing region of a graphical user interface. The data manager 140 then, in response to receiving a selection of at least one transaction event of interest, displays corresponding video data within a second viewing region of the graphical user interface The data manager 140, in place of, or in addition to, displaying the visual indicator can add the visual indicator to the video data. By way of a non-limiting example, video and data can be processed to incorporate visual indicators or equivalent marks within the video data using one computer system and/or data processing center. After adding the visual indicators, the data manager 140 can transmit the modified video data to a separate computer system. The separate computer system can then execute display of the visual indicators.

Referring now to FIG. 13, in step 1310 data manager 140 obtains video data. The video data includes video frames of point-of-sale transactions occurring at a point-of-sale transaction area. The video data includes transaction events. In step 1320, data manager 140 obtains transaction data. The transaction data includes transaction data captured from the point-of-sale transactions occurring at the point-of-sale transaction area. The transaction data includes transaction events recorded via at least one point-of-sale transaction device. The transaction data is correlated with the video data. In step 1330, the data manager 140 identifies transaction events of interest.

In step 1340, the data manager 140 provides a graphical user interface for selection and viewing of transaction events. By way of a non-limiting example, such a graphical user interface can include a network-based interface that can display one or more sections of transaction data.

In step 1350, in response to receiving a selection, via the graphical user interface, of at least one transaction event of interest, the data manager 140 displays video data of a point-of-sale transaction corresponding to the selected transaction event of interest by initiating playback of the corresponding video data beginning at about a point of occurrence of the transaction event of interest within the corresponding point-of-sale transaction. In other words, when data manager 140 begins playback of video data of the corresponding transaction, the data manager 140 begins playback at the transaction event of interest. Playback can optionally be automatically started in response to a selection of a particular transaction event interest, or manually started such as by selecting a "play button" in a corresponding video clip reviewer after indicating a specific transaction or transaction event. In either situation, the data manager 140 can initiate playback by beginning playback of the transaction at the corresponding transaction incident.

The data manager 140 also simultaneously loads video data for remaining transaction events from the corresponding transaction. Such a loading technique reduces delays in displaying additional video data.

The data manager 140 can also jump between transaction events within a given transaction. For example, in response to receiving a selection of a given transaction event displayed in the list of transaction events, the data manager 140 modifies playback to initiate playback beginning at a position in the video data corresponding to the selection of the given transaction event. In other words, playback of video of a given transaction jumps between selected transaction events to restart playback beginning or continuing at a corresponding selected transaction event. The data manager 140 can also display a list of transaction events from the corresponding transaction during playback, and highlight a current transaction event being displayed in the video data. In addition to highlighting, the data manager 140 can also automatically scroll the displayed list of transaction events according to progression of transaction events during playback of the corresponding video data.

In other embodiments, the system can operate or execute a summary mode feature for viewing a video summary of transaction events of interest within a given transaction or within multiple transactions. In this embodiment, the data manager 140 identifies a portion of the video data from a given point-of-sale transaction. This portion defines a duration of video data surrounding the at least one transaction event of interest. The duration of the portion of video data is less than a duration of the video data corresponding to the given point-of-sale transaction, thereby providing a summary. In response to receiving a selection of the at least one transaction event of interest, the data manager 140 displays that portion of video data.

Data manager 140 can identify multiple transaction events of interest, and identify respective portions of the video data from the given point-of-sale transaction. For each respective transaction event of interest, the respective portions define a length or duration of video data surrounding each transaction event of interest. The data manager 140 can then successively display the respective portions of the video data, thereby providing a summary display of multiple transaction events of interest. Such a display can include ordering or reordering the respective portions of the video data in a given sequence for playback based on characteristics of the transaction events of interest. The data manager 140 can identify the portion of the video data from the given point-of-sale transaction, by identifying a first predetermined period of time that precedes the transaction event of interest, and identifying a second predetermined period of time that follows the transaction event of interest. In other words, upon identifying a point of occurrence of a particular transaction event of interest, the data manager 140 can include a specific amount of time or length of video that precedes the point of occurrence and that follows the point of occurrence as the summary portion of video. Alternatively, identifying the portion of the video data includes determining the duration of video data surrounding the at least one transaction event of interest based on a type of transaction event of interest. For example, a transaction event involving an item void might require a relatively longer video summary clip than a transaction event involving a missed scan.

In yet another embodiment, data manager 140 provides a graphical user interface that displays transaction statistics. Such a graphical user interface can receive a selection of filter criteria for transaction statistics of interest, and in response, group transaction data according to the selected filter criteria and display summary information associated with the group of transaction data. Receiving the selection of filter criteria can include receiving at least one of cashier identity, store identity, time period, set of time periods, point-of-sale register, company, division, region, management identity, characteristics of events of interest, transaction characteristics, cashier characteristics, point-of-sale register characteristics, or results of video analysis. Displaying summary information associated with the group of transaction data can include displaying transaction data such as number of transaction events of interest, characteristics of transaction events of interest, speed, accuracy, sales volume, point-of-sale activity volume, labor volume, utilization statistics, efficiency statistics, effectiveness statistics, or relative comparison statistics, and so forth.

In one embodiment, displaying summary information associated with the group of transaction data can include displaying a graphical visual indicator that indicates magnitude of a given transaction datum compared to other transaction data. Magnitude can be indicated by a geometrical size of the graphical visual indicator relative to respective geometrical sizes of additional graphical visual indicators. For example, statistical visual indicators 944, in FIG. 9, convey magnitude or quantity as rectangles of various sizes. The data manager 140 can also indicate magnitude by a color of the graphical visual indicator relative to respective colors of additional graphical visual indicators.

In another embodiment summary information associated with a group of transaction data can be displayed as selectable information. In response to receiving a selection of a selectable information, data manager 140 can display transaction event summary information associated with the selected information. This can include displaying a graph of transaction events of interest, with the graph including selectable portions. In response to receiving a selection of a selectable portion, the data manager 140 displays transaction event summary information associated with the selected portion. Such summary information can include a list of cashiers and displaying a graphical visual indicator adjacent to respective cashiers, such that each respective graphical visual indicator indicates a magnitude of transaction events of interest linked to a corresponding cashier. Such a portion, for example, can be a node of a line graph or section of a pie chart, etc.

The data manager 140 can display transaction events of interest grouped according to at least one predetermined basis, with the grouped transaction events of interest displayed within a first viewing region of a graphical user interface. In response to receiving a selection of at least one transaction event of interest, the data manager 140 displays corresponding video data within a second viewing region of the graphical user interface. In other words, the system can be embodied as a web-based reviewer and function using multiple viewing regions or areas.

Data manager 140 can also display an accuracy rate of respective cashiers, with this accuracy rate determined based on the analysis of the video data and/or the transaction data.

Continuing with FIG. 14, the following discussion provides a basic embodiment indicating how to carry out functionality associated with the data manager 140 as discussed above. It should be noted, however, that the actual configuration for carrying out the data manager 140 can vary depending on a respective application. For example, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 110 is shown connected to display monitor 130 for displaying a graphical user interface 133 for a user 106 to operate using input devices 116. Repository 181 can optionally be used for storing data files and content both before and after processing. Input devices 116 can include one or more devices such as a keyboard, computer mouse, etc.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the data manager 140 of computer system 110 to communicate over a network and, if necessary, retrieve any data required to create views, process content, communicate with a user, etc. according to embodiments herein.

As shown, memory system 112 is encoded with data manager 140-1 that supports functionality as discussed above and as discussed further below. Data manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the data manager 140-1. Execution of the data manager 140-1 produces processing functionality in data manager process 140-2. In other words, the data manager process 140-2 represents one or more portions of the data manager 140 performing within or upon the processor 113 in the computer system 110.

It should be noted that, in addition to the data manager process 140-2 that carries out method operations as discussed herein, other embodiments herein include the data manager 140-1 itself (i.e., the un-executed or non-performing logic instructions and/or data). The data manager 140-1 may be stored on a non-transitory, tangible computer-readable storage medium including computer readable storage media such as floppy disk, hard disk, optical medium, etc. According to other embodiments, the data manager 140-1 can also be stored in a memory type system such as in firmware, read only memory (ROM), or, as in this example, as executable code within the memory system 1012.

In addition to these embodiments, it should also be noted that other embodiments herein include the execution of the data manager 140-1 in processor 113 as the data manager process 140-2. Thus, those skilled in the art will understand that the computer system 110 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method comprising:
   obtaining video data, the video data including video frames of point-of-sale transactions occurring at a point-of-sale transaction area, the video data including transaction events;
   obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;

identifying transaction events of interest;

displaying, via a computer processing apparatus, video from the video data on a display screen, the video data capturing at least one transaction event identified as a transaction event of interest; and displaying, via the computer processing apparatus, a visual indicator positioned at a spatial location within at least one video frame of the video, the at least one video frame displayed on the display screen, a position of the visual indicator in the displayed at least one video frame identifying a location of at least one object captured within the at least one video frame, the at least one object corresponding to the at least one transaction event identified as a transaction event of interest.

2. The method of claim 1, wherein the visual indicator positioned at the spatial location within the displayed at least one video frame includes the visual indicator being positioned at a coordinate location in the at least one video frame, wherein the position of the visual indicator identifies the location of the at least one object within the displayed at least one video frame.

3. The method of claim 1, wherein displaying the visual indicator includes displaying the visual indicator as an icon, the icon having a shape selected from the group consisting of: target, crosshair, circle, rectangle, polygon, arrow, object outline, and pointer.

4. The method of claim 1, wherein the position of the visual indicator identifying the location of the at least one object within the video frame includes identifying the location of the at least one object in an item carrier.

5. The method of claim 1, wherein displaying the visual indicator includes displaying a textual annotation in addition to the visual indicator, the textual annotation indicating an identified characteristic of the transaction event of interest.

6. The method of claim 1, wherein displaying the visual indicator includes displaying multiple visual indicators overlaid on each other, each of the multiple visual indicators being overlaid at offset distances from remaining visual indicators creating an appearance of a stack of visual indicators.

7. The method of claim 1, wherein displaying the visual indicator includes displaying multiple visual indicators, each of the multiple visual indicators spatially positioned within the least one video frame to identify separate objects within the video frame.

8. The method of claim 1, wherein displaying the visual indicator includes displaying the visual indicator using a predetermined color, the predetermined color representing a specific type of transaction event of interest.

9. The method of claim 1, further comprising:

automatically identifying the at least one object within the at least one video frame, based on image analysis; and
automatically adding the visual indicator to the video data.

10. The method of claim 1, further comprising:

receiving manual input, via a graphical user interface of the displayed video, indicating the location of the at least one object within the at least one video frame; and
in response to receiving the manual input, positioning the visual indicator within the at least one video frame at the spatial location identifying the location of at least one object.

11. The method of claim 1, wherein displaying the visual indicator includes displaying the visual indicator using a visual animation sequence.

12. The method of claim 11, wherein displaying the visual animation sequence comprising:

displaying the visual indicator at a first geometric size; and
subsequently displaying the visual indicator at a second geometric size, the second geometric size being a smaller geometric size relative to the first geometric size.

13. The method of claim 1, wherein displaying the visual indicator includes magnifying a region of interest on the least one video frame of the displayed video, the region of interest including the at least one object.

14. The method of claim 1, further comprising initiating execution of at least one non-visual indicator in connection with displaying the visual indicator, the at least one non-visual indicator identifying occurrence of the at least one transaction event identified as a transaction event of interest, the at least one non-visual indicator selected from the group consisting of: audible sound, spoken audio, and haptic indicator.

15. The method of claim 1, wherein displaying video, from the video data, that includes at least one transaction event identified as a transaction event of interest includes modifying a playback speed of the video data.

16. The method of claim 15, wherein modifying the playback speed of the video includes playing video, of the at least one transaction event identified as a transaction event of interest, at a first playback speed, and playing video of remaining transaction events at a second playback speed, the first playback speed being slower than the second playback speed.

17. The method of claim 1, further comprising:

displaying transaction events of interest grouped according to at least one predetermined basis, the grouped transaction events of interest displayed within a first viewing region of a graphical user interface; and
in response to receiving a selection of a specific transaction event of interest, displaying corresponding video data within a second viewing region of the graphical user interface.

18. A computer system comprising:

a processor; and
a memory coupled to the processor, the memory storing instructions that when executed by the processor cause the system to perform the operations of:
obtaining video data, the video data including video frames of point-of-sale transactions occurring at a point-of-sale transaction area, the video data including transaction events;
obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;
identifying transaction events of interest;
displaying video, from the video data, that includes at least one transaction event identified as a transaction event of interest; and
displaying a visual indicator positioned at a spatial location within at least one video frame of the displayed video, the position of the visual indicator identifying a location of at least one object captured within the at least one video frame, the at least one object corresponding to the at least one transaction event identified as a transaction event of interest.

19. The computer system of claim 18, wherein displaying the visual indicator includes displaying the visual indicator as an icon, the icon having a shape selected from the group consisting of target, crosshair, circle, rectangle, polygon, arrow, object outline, and pointer.

20. The computer system of claim 18, wherein displaying the visual indicator includes displaying multiple visual indicators overlaid on each other, each of the multiple visual indicators being overlaid at predetermined offset distances from remaining visual indicators creating an appearance of a stack of visual indicators.

21. The computer system of claim 18, the memory storing further instructions that, when executed by the processor, cause the system to perform the operations of:
   automatically identifying the at least one object within the at least one video frame, based on image analysis; and
   automatically adding the visual indictor to the video data.

22. The computer system of claim 18, the memory storing further instructions that, when executed by the processor, cause the system to perform the operations of:
   receiving manual input, via a graphical user interface of the displayed video, indicating the location of the at least one object within the at least one video frame; and
   in response to receiving the manual input, positioning the visual indicator within the at least one video frame at the spatial location identifying the location of at least one object.

23. The computer system of claim 18, wherein displaying the visual indicator includes displaying the visual indicator using a visual animation sequence.

24. A method comprising:
   obtaining video data, the video data including video frames of point-of-sale transactions occurring at a point-of-sale transaction area, the video data including transaction events;
   obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;
   identifying transaction events of interest;
   via a computer processing apparatus, modifying the video data to include a visual indicator, the visual indicator identifying at least one transaction event identified as a transaction event of interest, the visual indicator positioned at a spatial location within at least one video frame of the video data such that the spatial location of the visual indicator identifies a location of at least one object in the at least one video frame, the at least one object corresponding to the at least one transaction event identified as a transaction event of interest.

25. The method of claim 24, wherein modifying the video data comprises:
   automatically identifying the at least one object within the at least one video frame based on image analysis and the analysis of the transaction data; and
   automatically adding the visual indicator to the video data.

26. The method of claim 24, wherein modifying the video data comprises:
   receiving manual input, via a graphical user interface of displayed video data, indicating the location of the at least one object within the at least one video frame; and
   in response to receiving the manual input, positioning the visual indicator within the at least one video frame at the spatial location identifying the location of at least one object.

27. The method of claim 24, wherein the visual indicator positioned at the spatial location within the at least one video frame includes the visual indicator being positioned at a coordinate location with the at least one video frame, wherein the position of the visual indicator identifies the location of the at least one object within the video frame based on a criterion selection from the group consisting of the coordinate location of the visual indicator, a shape of the visual indicator, and an orientation of the visual indicator.

28. A method comprising:
   obtaining video data, the video data including video frames of point-of-sale transactions occurring at a point-of-sale transaction area, the video data including transaction events;
   obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;
   identifying transaction events of interest;
   via a computer processing apparatus, displaying, on a display screen, a graphical user interface for selection and viewing of transaction events; and
   via the computer processing apparatus: in response to receiving a selection, via the graphical user interface displayed on the display screen, of at least one transaction event of interest, displaying video data of a point-of-sale transaction corresponding to the selected at least one transaction event of interest by initiating playback of the corresponding video data on the display screen beginning at about a point of occurrence of the transaction event of interest within the corresponding point-of-sale transaction.

29. The method of claim 28, wherein initiating playback of the corresponding video data includes simultaneously loading video data for remaining transaction events from the corresponding transaction.

30. The method of claim 28, further comprising:
   displaying a list of transaction events from the corresponding transaction being played; and
   in response to receiving a selection of a given transaction event displayed in the list of transaction events, modifying playback to initiate playback beginning at a position in the video data corresponding to the selection of the given transaction event.

31. The method of claim 28, further comprising:
   displaying a list of transaction events from the corresponding transaction during playback;
   highlighting a current transaction event being displayed in the video data; and
   automatically scrolling the displayed list of transaction events according to progression of transaction events during playback of the corresponding video data.

32. A computer system comprising:
   a processor; and
   a memory coupled to the processor, the memory storing instructions that when executed by the processor cause the system to perform the operations of:
   obtaining video data, the video data including video frames of point-of-sale transactions occurring at a point-of-sale transaction area, the video data including transaction events;
   obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;
   identifying transaction events of interest;
   providing a graphical user interface for selection and viewing of transaction events; and in response to receiving a selection, via the graphical user interface, of at least one transaction event of interest, displaying video data of a point-of-sale transaction corresponding to the selected at least one transaction event of interest by initiating playback of the corresponding video data beginning at about a point of occurrence of the transaction event of interest within the corresponding point-of-sale transaction.

33. A method comprising:

obtaining video data, the video data including video frames of point-of-sale transactions occurring at a point-of-sale transaction area, the video data including transaction events;

obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;

identifying transaction events of interest;

identifying video data corresponding to a given point-of-sale transaction that includes at least one transaction event of interest;

via a computer processing apparatus, identifying a portion of the video data from the given point-of-sale transaction, the portion defining a duration of video data surrounding the at least one transaction event of interest, the duration of the portion of video data being less than a duration of the video data corresponding to the given point-of-sale transaction; and via the computer processing apparatus, in response to receiving a selection of the at least one transaction event of interest, displaying the portion of video data on a display screen.

34. The method of claim 33, further comprising:

wherein identifying the video data corresponding to a given point-of-sale transaction that includes multiple transaction events of interest;

identifying respective portions of the video data from the given point-of-sale transaction, for each respective transaction event of interest, the respective portions defining a duration of video data surrounding each transaction event of interest; and successively displaying the respective portions of the video data.

35. The method of claim 34, wherein successively displaying the respective portions of the video data includes ordering the respective portions of the video data for playback based on characteristics of the transaction events of interest.

36. The method of claim 33, wherein identifying the portion of the video data from the given point-of-sale transaction includes identifying a first predetermined period of time that precedes the at least one transaction event of interest, and identifying a second predetermined period of time that follows the at least one transaction event of interest.

37. The method of claim 33, wherein identifying the portion of the video data from the given point-of-sale transaction includes determining the duration of video data surrounding the at least one transaction event of interest based on a type of transaction event of interest.

38. A method comprising:

via a computer processing apparatus performing operations of:

obtaining video data, the video data including video frames of point-of-sale transactions occurring at a point-of-sale transaction area, the video data including transaction events;

obtaining transaction data, the transaction data including transaction data captured from the point-of-sale transactions occurring at the point-of-sale transaction area, the transaction data including transaction events recorded via at least one point-of-sale transaction device, the transaction data being correlated with the video data;

identifying transaction events of interest;

displaying, on a display screen, a graphical user interface that displays transaction statistics;

displaying filter criteria in the graphical user interface on the display screen; and in response to receiving a selection of the filter criteria for transaction statistics of interest, grouping transaction data according to the selected filter criteria and displaying summary information on the display screen, the summary information associated with the group of transaction data.

39. The method of claim 38, wherein receiving the selection of filter criteria includes receiving a selection from the group consisting of cashier identity, store identity, time period, set of time periods, point-of-sale register, company, division, region, management identity, characteristics of events of interest, transaction characteristics, cashier characteristics, point-of-sale register characteristics, and results of video analysis.

40. The method of claim 38, wherein displaying summary information associated with the group of transaction data includes displaying transaction data selected from the group consisting of number of transaction events of interest, characteristics of transaction events of interest, speed, accuracy, sales volume, point-of-sale activity volume, labor volume, utilization statistics, efficiency statistics, effectiveness statistics, and relative comparison statistics.

41. The method of claim 38, wherein displaying summary information associated with the group of transaction data includes displaying a graphical visual indicator that indicates magnitude of a given transaction datum compared to other transaction data.

42. The method of claim 41, wherein displaying the graphical visual indicator that indicates magnitude includes indicating magnitude by a geometrical size of the graphical visual indicator relative to respective geometrical sizes of additional graphical visual indicators.

43. The method of claim 41, wherein displaying the graphical visual indicator that indicates magnitude includes indicating magnitude by a color of the graphical visual indicator relative to respective colors of additional graphical visual indicators.

44. The method of claim 41, further comprising:

wherein displaying summary information associated with the group of transaction data includes displaying selectable information, and in response to receiving a selection of a selectable information, displaying transaction event summary information associated with the selected information.

45. The method of claim 38, further comprising:

wherein displaying summary information associated with the group of transaction data includes displaying a graph of transaction events of interest, the graph including selectable portions, and in response to receiving a selection of a selectable portion, displaying transaction event summary information associated with the selected portion.

46. The method of claim 38, wherein displaying summary information includes displaying a list of cashiers and displaying a graphical visual indicator adjacent to respective cashiers, each respective graphical visual indicator indicating a magnitude of transaction events of interest linked to a corresponding cashier.

47. The method of claim 38, further comprising:
displaying transaction events of interest grouped according to at least one predetermined basis, the grouped transaction events of interest displayed within a first viewing region of a graphical user interface; and
in response to receiving a selection of a specific transaction event of interest, displaying corresponding video data within a second viewing region of the graphical user interface.

48. The method of claim 38, further comprising displaying an accuracy rate of respective cashiers, the accuracy rate determined based on the analysis of the video data and the transaction data.

49. The method of claim 28, wherein initiating playback of the corresponding video data includes automatically initiating playback in response to receiving the selection via the graphical user interface.

50. The method of claim 1, further comprising:
displaying transactions grouped according to at least one predetermined basis, the grouped transactions displayed within a first viewing region of a graphical user interface; and
in response to receiving a selection of a specific transaction, displaying corresponding video data within a second viewing region of the graphical user interface.

51. The method of claim 38, further comprising:
displaying transactions grouped according to at least one predetermined basis, the grouped transactions displayed within a first viewing region of a graphical user interface; and
in response to receiving a selection of a specific transaction, displaying corresponding video data within a second viewing region of the graphical user interface.

52. The method as in claim 1, wherein the object represents a retail item present in the point of sale transaction area, the retail item not properly scanned for purchase.

53. The method as in claim 1 further comprising:
displaying, on the display screen, a listing of retail items that are properly scanned by a point of sale register in the point of sale transaction area, the displayed video data capturing images of the retail items presented in the point of sale transaction area; and
displaying an entry in the listing to indicate the object identified by the visual indicator.

54. The method as in claim 53 further comprising:
displaying a descriptor in the entry, the descriptor indicating a type of loss that occurs with respect to the object identified by the visual indicator.

55. The method as in claim 1 further comprising:
magnifying a display of the object on the display screen, the object representing a retail item, the object handled in the point of sale transaction area along with multiple retail items purchased by a customer.

56. The method as in claim 1, wherein the object is a retail item passing through the point of sale transaction area, the method further comprising:
displaying the at least one video frame on the display screen, the displayed at least one video frame including display of the visual indicator positioned at a coordinate location in the displayed at least one frame, the visual indicator indicating a location of the retail item in an image of the point of sale transaction area.

57. The method as in claim 2, wherein the position of the visual indicator identifies the location of the at least one object within the displayed at least one video frame based on at least one parameter selected from the group consisting of: coordinate location of the visual indicator, a shape of the visual indicator, and an orientation of the visual indicator.

58. A method comprising:
via computer processing hardware: receiving video data, the video data capturing images of a set of retail items handled in a point-of-sale transaction area;
via the computer processing hardware: receiving transaction data generated by a point of sale register in the point of sale transaction area, the transaction data indicating purchase of at least one retail item in the set, the transaction data correlated to the video data;
via the computer processing hardware: displaying a portion of the video data on a display screen, the displayed portion of the video data including an image of a particular retail item in the set that was not included for purchase by the point of sale register; and
via the computer processing hardware: displaying a visual indicator at a location on the display screen, the displayed visual indicator indicating a location of the particular retail item in the displayed portion of the video data.

59. The method as in claim 58 further comprising:
on the display screen, displaying a listing of at least one retail item in the set that was properly scanned for purchase by the point of sale register; and
on the display screen, displaying an entry in the listing to indicate the particular retail item identified by the visual indicator.

60. The method as in claim 59 further comprising:
displaying a descriptor in the entry, the descriptor indicating a type of loss that occurs with respect to the particular retail item identified by the visual indicator.

* * * * *